United States Patent
Zheng et al.

(10) Patent No.: US 12,325,056 B2
(45) Date of Patent: Jun. 10, 2025

(54) MULTI-SENSOR-BASED HOT FORMING PRODUCTION SYSTEM FOR ALUMINUM ALLOY SHEET METAL PART AND CONTROL METHOD THEREOF

(71) Applicant: DALIAN UNIVERSITY OF TECHNOLOGY, Liaoning (CN)

(72) Inventors: Kailun Zheng, Dalian (CN); Jiaai Shi, Dalian (CN); Youquan Qiu, Dalian (CN); Shengyu Liu, Dalian (CN); Yinuo Chen, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 18/829,263

(22) Filed: Sep. 9, 2024

(65) Prior Publication Data
US 2025/0144691 A1    May 8, 2025

(30) Foreign Application Priority Data
Nov. 3, 2023 (CN) .......................... 202311456778.9

(51) Int. Cl.
*B21D 22/02* (2006.01)
(52) U.S. Cl.
CPC .................. *B21D 22/022* (2013.01)
(58) Field of Classification Search
CPC ...... B21D 22/02; B21D 22/022; B21D 37/16; C21D 1/673
See application file for complete search history.

(56) References Cited

U.S. PATENT DOCUMENTS

| | | | |
|---|---|---|---|
| 2010/0096765 A1* | 4/2010 | Kuwayama | G01L 5/0076 425/169 |
| 2023/0203633 A1 | 6/2023 | Zheng et al. | |

FOREIGN PATENT DOCUMENTS

| | | |
|---|---|---|
| CN | 108994135 A | 12/2018 |
| CN | 111496050 A | 8/2020 |

(Continued)

OTHER PUBLICATIONS

CN 106282860A, Hu et al. Jan. 2017.*
(Continued)

*Primary Examiner* — Edward T Tolan
(74) *Attorney, Agent, or Firm* — PORUS IP LLC

(57) ABSTRACT

The present disclosure discloses a multi-sensor-based hot forming production system for an aluminum alloy sheet metal part and a control method thereof, and belongs to the field of aluminum alloy sheet metal forming manufacturing technology. A plurality of sensors are disposed in the hot forming production system, and closed-loop control of a whole process and adaptive production can be realized based on deformation properties, a microstructure evolution law, and a mechanical property change law of the aluminum alloy sheet metal part. The hot forming production system comprises a control system based on a multi-physical quantity model, an environmental heating furnace, an automated transfer and positioning device, a hot stamping and forming device, and an in-die aging device. By using the hot forming production system and the control method thereof, the product quality and the stability of the forming process can be effectively improved, and the adaptability of the process to form different types of alloys can be enhanced.

15 Claims, 5 Drawing Sheets

(56) References Cited

FOREIGN PATENT DOCUMENTS

CN        115921651 A     4/2023
WO     2019205768 A1   10/2019

OTHER PUBLICATIONS

WO 2014/068493A1, Yamashita et al. May 2014.*
WO 2021/100954A1, Seong et al. May 2021.*
CN 112588920A, Gao et al. Apr. 2021.*
CN 114318182A, Zheng et al. Apr. 2022.*
JP 2011-63868A, Nishiguchi Mar. 2011.*
Decision to Grant a Patent in Chinese Application No. 202311456778.9 mailed on May 31, 2024, 4 pages.

* cited by examiner

MULTI-SENSOR-BASED HOT FORMING PRODUCTION SYSTEM FOR ALUMINUM ALLOY SHEET METAL PART AND CONTROL METHOD THEREOF

CROSS-REFERENCE TO RELATED APPLICATIONS

This application claims priority to Chinese Patent Application No. 202311456778.9, filed on Nov. 3, 2023, the entire contents of which are incorporated herein by reference.

TECHNICAL FIELD

The present disclosure relates to the field of aluminum alloy sheet metal forming and manufacturing technology, and in particular to a multi-sensor-based hot forming production system for an aluminum alloy sheet metal part and a control method thereof.

BACKGROUND

Aluminum alloy has the advantages of good corrosion resistance and high specific strength, and it is an important structural material used in the aerospace industry. Thin-walled sheet metal parts are a large class of structures for aircrafts, rockets, and other equipment, and are mostly formed by a steel die stamping method. However, under the cold forming condition, the aluminum alloy has poor formability, making it difficult to form the workpiece with a complex shape, and the modulus is low, the springback is large, making it difficult to ensure the precision requirements of the component. In order to simultaneously meet the shape complexity and the high precision, the hot forming process is an advanced method for forming complex shaped aluminum alloy components in recent years.

Currently, the mainstream hot forming processes include superplastic forming, rapid hot gas expansion forming, and hot stamping-quenching integrated process. The superplastic forming forms a workpiece using the superplasticity of an alloy under a specific condition and can realize the forming of a complex shaped workpiece. However, there are many limitations to the superplastic forming. First, the superplastic forming has high requirements for an alloy billet with a grain size being within a range of 5-10 μm, and the growth rate of grains during the forming should be low. In addition, the superplastic forming can only be performed within a strain rate of $10^{-5}$-$10^{-1}$ s, resulting in a low productivity of the superplastic forming. In addition, local thinning of the alloy may occur during the superplastic forming, which is not conducive to the control of the forming quality of the product. The rapid hot gas expansion forming has low requirements for the alloy billets than the superplastic forming, and the strain rate during forming is higher, leading to a higher productivity. However, the deformation capacity of the alloy during the rapid hot gas expansion molding is limited, making it difficult to form the complex shaped workpiece. In addition, the rapid hot gas expansion forming is mostly used for forming 5xxx aluminum alloy workpieces that cannot be strengthened by thermal treatment. If the rapid hot gas expansion forming is applied to form heat-treatable aluminum alloy workpieces, it is necessary to carry out subsequent thermal treatment to ensure the mechanical properties after forming, and the thermal treatment may lead to heat treatment deformation of the workpieces, resulting in a decrease in the precision of forming. The hot stamping-quenching integrated process combines hot forming and thermal treatment processes. First, the billet is subjected to solution treatment, then the billet is quickly transferred to a cold die, which is rapidly closed to simultaneously achieve hot stamping and forming and quenching thermal treatment of the workpiece, and then finally the workpiece is subjected to the subsequent aging treatment. However, the hot stamping-quenching integrated process has limitations. First, in the process of transferring the billet, which has completed the solid solution treatment, to the cold die, the billet undergoes heat exchange with the air to cause a decrease in temperature, which makes the process less stable. In addition, because the temperature of the cold die is too low, the workpiece is unable to undergo stress relaxation during hot stamping and forming and cold die quenching, causing severe springback of the workpiece after the forming process, and a decrease in the forming precision of the workpiece. Furthermore, the subsequent aging time of the hot stamping-quenching integrated process is relatively long, resulting in a longer production cycle of the workpiece and reduction in productivity.

The architectural composition of an existing aluminum alloy hot stamping production line mainly includes a heating furnace, a transfer device, a hot stamping device, and an aging treatment device. The heating furnace is configured to heat the aluminum alloy slab to a desired temperature. The transfer device is configured to transfer the billet or finished formed workpiece quickly between each process. The hot stamping device is configured to perform hot stamping and forming of the billet and in-die pressure holding quenching. The aging device is configured to perform the aging treatment on the workpiece to make the structure properties meet the corresponding requirements.

The hot stamping process of the aluminum alloy is a non-isothermal process with a very complex process environment, and the stability of the forming process is poor under the combined effect of different factors, leading to a high rejection rate. However, the existing aluminum alloy hot stamping production line lacks sensors, making it unable to collect relevant parameters in the process in real time or obtain the temperature, stamping rate, and other parameters according to the target mechanical properties of the workpiece. In addition, corresponding feedback control of the devices in the production line cannot be performed, and the control of the product quality cannot be guaranteed, thus affecting the stability of the forming process. Therefore, it is desirable to provide a multi-sensor-based efficient and stable production system for hot stamping of an aluminum alloy sheet metal part and an intelligent control method thereof.

SUMMARY

One or more embodiments of the present disclosure provide a multi-sensor-based hot forming production system for an aluminum alloy sheet metal part. A plurality of sensors may be disposed in the hot forming production system. The hot forming production system may realize closed-loop control of a whole process and adaptive production of the aluminum alloy sheet metal part based on deformation properties, a microstructure evolution law, and a mechanical property change law of a formed aluminum alloy. The hot forming production system may comprise a plurality of functional devices. The plurality of functional devices may include a control system based on a multi-physical quantity model, an environmental heating furnace, an automated transfer and positioning device, a hot stamping and forming device, and an in-die aging device.

The control system may be configured to control all the functional devices of the hot forming production system. Each of the functional devices is capable of interacting with the control system. At the end of each process step, the control system may perform preliminary feedback control of the functional devices for the next process step based on received parameters of a billet or a workpiece. The control system may be provided with a constitutive model, a forming limit model, a TTT model, a TTP model, and a yield strength model of an alloy. The control system is capable of adjusting relevant parameters of the functional devices based on the constitutive model, the forming limit model, the TTT model, the TTP model, and the yield strength model to ensure the forming quality and mechanical properties of the workpiece.

A plurality of first temperature sensors may be provided in the environmental heating furnace. The plurality of first temperature sensors may be configured to collect temperature information at different positions of the billet during a solution treatment process.

One or two automated transfer and positioning devices may be provided in the hot forming production system. Each of the one or two automated transfer and positioning devices may be configured simultaneously or separately to transfer the billet after the solution treatment and the workpiece after a first process in-die aging treatment.

In response to determining that one automated transfer and positioning device is provided in the hot forming production system, the automated transfer and positioning device may be provided with a plurality of second temperature sensors. The plurality of second temperature sensors may be configured to collect temperature information at different positions of the billet after the solution treatment, or to collect temperature information at different positions of the workpiece after the first process in-die aging treatment.

In response to determining that two automated transfer and positioning devices are provided in the hot forming production system, the two automated transfer and positioning devices may be provided with the plurality of second temperature sensors and a plurality of fifth temperature sensors, respectively. The plurality of second temperature sensors may be configured to collect the temperature information at different positions of the billet after the solution treatment. The plurality of fifth temperature sensors may be configured to collect the temperature information at different positions of the workpiece after the first process in-die aging treatment.

The hot stamping and forming device may include a hot stamping press, a temperature controllable hot stamping die, a plurality of third temperature sensors, a plurality of fourth temperature sensors, a displacement sensor, a speed sensor, and a first pressure sensor. The plurality of third temperature sensors and the plurality of fourth temperature sensors may be configured to collect temperature information at different positions of the billet or the workpiece, and the hot stamping die during hot stamping and forming, in-die quenching, and the first process in-die aging treatment. The displacement sensor may be configured to collect displacement information of an upper die of the hot stamping die. The speed sensor may be configured to collect stamping speed information of the upper die of the hot stamping die. The first pressure sensor may be configured to collect clamping pressure information of the hot stamping die during in-die quenching and the first process in-die aging treatment.

The in-die aging device may include an aging press, a temperature controllable aging die, a plurality of sixth temperature sensors, a plurality of seventh temperature sensors, and a second pressure sensor. The plurality of sixth temperature sensors and the plurality of seventh temperature sensors may be configured to collect temperature information at different positions of the workpiece and the aging die during a second process in-die aging treatment. The second pressure sensor may be configured to collect clamping pressure information of the aging die during the second process in-die aging treatment.

In some embodiments, a range of each of the plurality of first temperature sensors may include a solution treatment temperature of the aluminum alloy. Each of the plurality of first temperature sensors may be a contact temperature sensor or a non-contact sensor. The contact temperature sensor may include a platinum resistance temperature sensor or a thermocouple sensor. The non-contact sensor may include a thin-film optical temperature sensor. A spacing between two adjacent first temperature sensors of the plurality of first temperature sensors in the environmental heating furnace may be within a range of 50 mm-150 mm.

In some embodiments, in response to determining that one automated transfer and positioning device is provided in the hot forming production system, a range of each of the plurality of second temperature sensors may include a solution treatment temperature and a first process aging temperature of the aluminum alloy. In response to determining that two automated transfer and positioning devices are provided in the hot forming production system, the range of each of the plurality of second temperature sensors may include the solution treatment temperature of the aluminum alloy. A range of each of the plurality of fifth temperature sensors may include the first process aging temperature of the aluminum alloy.

In some embodiments, the plurality of second temperature sensors and the plurality of fifth temperature sensors may be contact temperature sensors or non-contact sensors. The contact temperature sensors may include the platinum resistance temperature sensor or the thermocouple sensor. The non-contact sensors may include the thin-film optical temperature sensor. A spacing between two adjacent second temperature sensors of the plurality of second temperature sensors on the automated transfer and positioning device may be within a range of 100 mm-150 mm. A spacing between two adjacent fifth temperature sensors of the plurality of fifth temperature sensors on the automated transfer and positioning device may be within a range of 100 mm-150 mm.

In some embodiments, a range of each the plurality of third temperature sensors and each of the plurality of fourth temperature sensors may include the solution treatment temperature and the first process aging temperature of the aluminum alloy. The plurality of third temperature sensors and the plurality of fourth temperature sensors may be contact temperature sensors. The contact temperature sensors may include the platinum resistance temperature sensor or the thermocouple sensor. A spacing between two adjacent third temperature sensors of the plurality of third temperature sensors on an operation surface of the hot stamping die may be within a range of 50 mm-150 mm. A spacing between two adjacent fourth temperature sensors of the plurality of fourth temperature sensors on the operation surface of the hot stamping die may be within a range of 50 mm-150 mm.

In some embodiments, the displacement sensor may be a linear displacement sensor. A range of the displacement sensor may include a travel range of the upper die of the hot stamping die. The displacement sensor may be a magnetic sensor or an optical sensor. The magnetic sensor may include a magnetostriction detector. The optical sensor may include a prism or a reflection sensor.

In some embodiments, the speed sensor may be a linear speed sensor. A range of the speed sensor may include a stamping speed range of the upper die of the hot stamping die. The speed sensor may be the magnetic sensor or a photoelectric sensor. The magnetic sensor may include a Hall sensor. The photoelectric sensor may include a photoelectric interrupter.

In some embodiments, a range of the first pressure sensor may include a clamping pressure range of the hot stamping die. Preferably, the first pressure sensor may be a piezoelectric sensor.

In some embodiments, the travel range of the upper die of the hot stamping die may be within a range of 1000 mm-1500 mm, the stamping speed range of the upper die of the hot stamping die may be within a range of 100 mm/s-1000 mm/s, and the clamping pressure range of the hot stamping press may be within a range of 1000 kN-50000 kN.

In some embodiments, a range of each of the plurality of sixth temperature sensors and each of the plurality of seventh temperature sensors may include a second aging temperature of the aluminum alloy. The plurality of sixth temperature sensors and the plurality of seventh temperature sensors may be the contact temperature sensors. The contact temperature sensors may include the platinum resistance temperature sensor or the thermocouple sensor. A spacing between two adjacent sixth temperature sensors of the plurality of sixth temperature sensors on an operation surface of the aging die may be within a range of 50 mm-150 mm. A spacing between two adjacent seventh temperature sensors of the plurality of seventh temperature sensors on the operation surface of the aging die may be within a range of 50 mm-150 mm.

In some embodiments, a range of the second pressure sensor may include a clamping pressure range of the aging die. The second pressure sensor may include the piezoelectric sensor.

In some embodiments, the clamping pressure range of the aging press may be within a range of 1000 KN-50000 kN.

One or more embodiments of the present disclosure further provide a control method of a multi-sensor-based hot forming production system for an aluminum alloy sheet metal part. The control method may comprise controlling the hot forming production system to operate based on a temperature and a stamping speed of an constitutive model of an alloy and a forming limit model of the alloy; controlling the hot forming production system to operate based on a quenching rate of a TTT model and a TTP model of the alloy; and controlling the hot forming production system to operate based on an aging temperature and an aging time of the TTT model, the TTP model, and a yield strength model of the alloy. During the entire production process performed by the hot forming production system, a plurality of sensors may collect sensing information in real time and input the sensing information into a control system based on a multiphysical quantity model. The control system may make corresponding determination based on a built-in alloy material model, optimize relevant process parameters and carries out feedback control of corresponding functional devices, and take a condition at the end of each process step as a preliminary condition for the next step to carry out preliminary feedback control of the functional devices of the next step.

One or more embodiments of the present disclosure further provide a multi-sensor-based hot forming production method for an aluminum alloy sheet metal part. The multi-sensor-based hot forming production method may comprise the following operations.

1, a solution treatment may be performed on a billet using an environmental heating furnace.

2, the billet completing the solution treatment may be rapidly transferred from the environmental heating furnace to a hot stamping press and positioned using an automated transfer and positioning device.

3, hot stamping and forming may be performed the billet on the hot stamping press.

4, in-die quenching and a first process in-die aging treatment may be continuously performed on a workpiece on the hot stamping press.

5, the workpiece completing the first process in-die aging treatment may be rapidly transferred from the hot stamping press to an aging press and positioned using the automated transfer and positioning device.

6, a second process in-die aging treatment may be performed on the workpiece on the aging press.

The technical solution of the present disclosure is further described in detail by means of the accompanying drawings and embodiments.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

REFERENCE SIGNS

Figure 1:
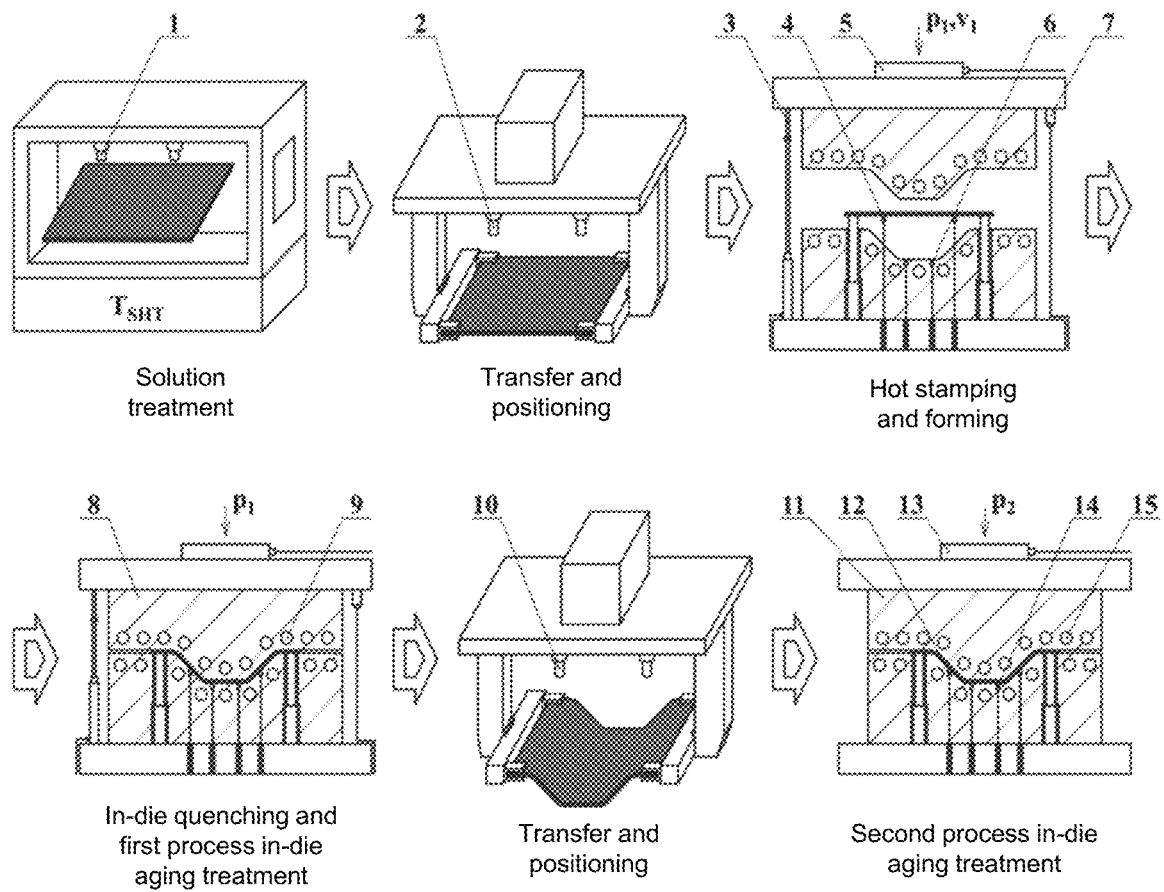
FIG. 1 is a schematic diagram illustrating an exemplary multi-sensor-based hot forming production system for an aluminum alloy sheet metal part according to some embodiments of the present disclosure.

1—first temperature sensor; 2—second temperature sensor; 3—displacement sensor; 4—third temperature sensor; 5—first pressure sensor; 6—fourth temperature sensor; 7—speed sensor; 8—upper die of a hot stamping die; 9—hot stamping die heating element; 10—fifth temperature sensor; 11—upper die of an aging die; 12—sixth temperature sensor; 13—second pressure sensor; 14—seventh temperature sensor; and 15—aging die heating element.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device", "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one", "a", "an", "one kind", and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

The technical solution of the present disclosure is further described below by means of the accompanying drawings and the embodiments.

Unless otherwise defined, technical terms or scientific terms used in the present disclosure shall have the ordinary meaning understood by a person of ordinary skill in the field to which the present disclosure belongs.

Embodiment 1

FIG. 1 is a schematic diagram illustrating an exemplary multi-sensor-based hot forming production system for an aluminum alloy sheet metal part according to some embodiments of the present disclosure. The multi-sensor-based hot forming production system for the aluminum alloy sheet metal part may also be referred to as a multi-sensor-based hot forming production line for the aluminum alloy sheet metal part or a hot forming production system.

The hot forming production system disclosed the present disclosure may include a plurality of functional devices. The plurality of functional devices refer to various devices used in the process of hot forming production for the aluminum alloy sheet metal part.

The plurality of functional devices may include a control system based on a multi-physical quantity model, an environmental heating furnace, an automated transfer and positioning device, a hot stamping and forming device, and an in-die aging device The control system may be configured to control all the functional devices of the hot forming production system. Each of the plurality of functional devices is capable of interacting with the control system. At the end of each process step, the control system may perform preliminary feedback control of the functional devices for the next process step based on received parameters of a billet or a workpiece.

Parameters of the workpiece refer to various variables and values used to describe and control the characteristics of the aluminum alloy sheet metal part during the processing of the aluminum alloy sheet metal part. For example, the parameters of the workpiece may include a dimension of the aluminum alloy sheet metal part, or the like. The process step is a separate operation process within the process of hot forming production for the aluminum alloy sheet metal part. In some embodiments, the process of hot forming production for the aluminum alloy sheet metal part may include a plurality of process steps.

In some embodiments, the control system may be provided with a constitutive model, a forming limit model, a TTT model, a TTP model, and a yield strength model of an alloy.

The constitutive model refers to a mathematical model used to describe a relationship between physical quantities such as stress, strain, and temperature distribution within a material when the material is subjected to an external action. The external action may include an action of force, temperature, an electromagnetic field, or the like. For example, the constitutive model may include a Hooke's law model, a constitutive equation, or the like.

The forming limit model may be configured to evaluate sheet forming capability.

The TTT model is a known machine learning model. The TTT model may be configured to process a long text.

The TTP model may be configured to perform high-precision change detection in remote sensing image.

The yield strength model refers to a mathematical or physical model used to describe a stress limit value at which a metallic material begins to undergo significant plastic deformation in case of an external force.

The control system is capable of adjusting the relevant parameters of the plurality of functional devices based on the constitutive model, the forming limit model, the TTT model, the TTP model, and the yield strength model to ensure the forming quality and mechanical properties of the workpiece. The relevant parameters may include weight values and hyper-parameters of each model of the environmental heating furnace, a set temperature of the environmental heating furnace, or the like. The set temperature refers to a heating temperature required by a user.

The environmental heating furnace refers to a heating device used to heat the material or the workpiece.

In some embodiments, the hot forming production system may perform a solution treatment on the billet using the environmental heating furnace, providing the billet with a homogeneous solid solution microstructure and avoiding over-burning of a low-melting alloy billet caused by the excessive solid solution treatment. The billet refers to a raw material that is not processed. A plurality of first temperature sensors 1 in the environmental heating furnace may collect temperature information of the billet in real time, simultaneously obtain time information by performing timing, and input the temperature information and the time information into the control system.

The temperature information may include temperature values at various positions of the billet in the environmental heating furnace, etc. The time information may include time corresponding to when the plurality of first temperature sensors 1 collect the temperature information of the billet in real time. The control system may determine, based on the collected temperature information and the collected time information, whether the temperature at various positions of the billet is uniformly attained and maintained at a solution treatment temperature, and whether solution treatment time meets corresponding requirements.

The solution treatment temperature refers to a temperature to which the billet is heated during the solution heat treatment. The solution treatment time refers to a total time required to heat the billet to the solution treatment temperature. The corresponding requirements may be preset by those skilled in the art based on experience. For example, the corresponding requirements may include whether the solution treatment time reaches a time threshold. The time threshold may be preset by those skilled in the art based on experience.

In response to the determining that the temperature at various positions of the billet does not uniformly reach and maintain at the solution treatment temperature, and/or the solution treatment time does not meet the corresponding requirements, the control system may optimize the heating temperature and the maintenance time of the environmental heating furnace until the temperature at various positions of the billet uniformly reaches and maintains at the solution treatment temperature, and the solution treatment time meets the corresponding requirements. The control system may realize feedback control of heating elements of the environmental heating furnace to ensure that the temperature at various positions of the billet reaches the solution treatment temperature rapidly and maintains for a certain time period. The temperature at various positions of the billet uniformly reaching and maintaining at the solution treatment temperature may be understood as that the temperature at various positions of the billet is essentially the same and maintains at the solution treatment temperature.

At the end of the solution treatment, the control system may also provide preliminary feedback control of the automated transfer and positioning device based on the temperature information received from the plurality of first temperature sensors 1 in the environmental heating furnace.

In some embodiments, a material of the billet may be an aluminum alloy capable of being strengthened by heat treatment. An original state of the billet may be in an O-state, a T-state, or an H-state.

In some embodiments, the plurality of first temperature sensors 1 may be provided in the environmental heating furnace. The plurality of first temperature sensors 1 may be configured to collect the temperature information at different positions of the billet during the solution treatment process. A range of each of the plurality of first temperature sensors 1 in the environmental heating furnace may include the solution treatment temperature of the aluminum alloy.

For 2xxxx (Al—Cu, Al—Cu—Mg and Al—Cu—Li) aluminum alloys, the solution treatment temperature may be within a range of 490° C.-540° C. 2xxx indicates the aluminum-copper alloy series. For 6xxxx (Al—Mg—Si) aluminum alloys, the solution treatment temperature may be within a range of 520° C.-540° C. 6xxxx indicates the aluminum-magnesium-silicon alloy series. For 7xxx (Al—Zn—Mg and Al—Zn—Mg—Cu) aluminum alloys, the solution treatment temperature may be within a range of 460° C.-500° C. 7xxxx indicates the aluminum-zinc alloy series. The plurality of first temperature sensors 1 may be contact temperature sensors or non-contact sensors. The contact temperature sensors may include a platinum resistance temperature sensor or a thermocouple sensor. The non-contact sensors may include a thin-film optical temperature sensor.

A spacing between two adjacent first temperature sensors 1 of the plurality of first temperature sensors 1 in the environmental heating furnace may be within a range of 50 mm-150 mm, such that the temperature information at different positions of the billet during the solution treatment can be received.

In some embodiments, a spacing between two adjacent heating elements of heating elements in the environmental heating furnace may be within a range of 50 mm-150 mm. When the temperature of the billet is not uniform during the solution treatment process, the heating elements at various positions may be adjusted to different power according to different temperature at various positions of the billet, and a temperature distribution of the billet may be adjusted in time to ensure that the temperature of the billet is uniform. The heating elements refer to elements that heat the aluminum alloy. For example, the heating elements may include a resistance wire, a metal bar, or the like.

In some embodiments, one or two automated transfer and positioning devices may be provided in the hot forming production system. Each of the one or two automated transfer and positioning devices may be configured simultaneously or separately to transfer a billet that completes the solution treatment and a workpiece that completes a first process in-die aging treatment.

The hot forming production system may rapidly transfer and position the billet that completes the solution treatment from the environmental heating furnace to the hot stamping press using the automated transfer and positioning device, avoiding temperature dissipation of the billet caused by uncertainty of a workshop environment.

At the beginning of transfer and positioning, the control system may perform the preliminary feedback control of the automated transfer and positioning device based on the temperature information received from the plurality of first temperature sensors 1 in the environmental heating furnace. A plurality of second temperature sensors 2 disposed on the automated transfer and positioning device may collect the temperature information of the billet in real time and input the temperature information into the control system. The control system may determine whether the transfer and positioning speed is fast enough based on the collected temperature information.

In response to determining that the transfer and the positioning speed is not fast enough, the control system may optimize the transfer and the positioning speed of the automated transfer and positioning device until the transfer and the positioning speed is fast enough. In this way, the control system may realize the corresponding feedback control of the automated transfer and positioning device, ensuring that the billet is transferred and positioned rapidly from the environmental heating furnace to the hot stamping press.

In some embodiments, in response to determining that the transfer and the positioning speed is greater than a speed threshold, the control system may determine that the transfer and the positioning speed is fast enough, or the control system may determine that the transfer and the positioning speed is not fast enough. The speed threshold may be preset by those skilled in the art based on experience.

In some embodiments, in response to determining that one automated transfer and positioning device is provided in the hot forming production system, the plurality of second temperature sensors may be disposed on the automated transfer and positioning device. A range of each of the plurality of second temperature sensors 2 may include the solution treatment temperature and a first process aging temperature of the aluminum alloy. The first process aging temperature refers to a temperature at which the billet is subjected to first heat treatment during an aging process.

For the 2xxxx (Al—Cu, Al—Cu—Mg and Al—Cu—Li) aluminum alloys, such as a 2219 aluminum alloy, the solution treatment temperature and the first process aging temperature may be within a range of 220° C.-535° C. For the 6xxxx (Al—Mg—Si) aluminum alloys, such as a 6082 aluminum alloy, the solution treatment temperature and the first process aging temperature may be within a range of 210° C.-530° C. For the 7xxxx (Al—Zn—Mg and Al—Zn—Mg—Cu) aluminum alloys, such as a 7075 aluminum alloy, the solution treatment temperature and the first process aging temperature may be within a range of 125° C.-485° C.

In response to determining that two automated transfer and positioning devices are provided in the hot forming production system, the plurality of second temperature sensors 2 and a plurality of fifth temperature sensors 10 may be disposed on the two automated transfer and positioning devices, respectively. A range of each of the plurality of second temperature sensors 2 may include the solution treatment temperature of the aluminum alloy, and a range of each of the plurality of fifth temperature sensors 5 may include the first process aging temperature of the aluminum alloy.

For the 2xxxx (Al—Cu, Al—Cu—Mg and Al—Cu—Li) aluminum alloys, the solution treatment temperature may be within a range of 490° C.-540° C. For the 6xxxx (Al—Mg—Si) aluminum alloys, the solution treatment temperature may be within a range of 520° C.-540° C. For the 7xxx (Al—Zn—Mg and Al—Zn—Mg—Cu) aluminum alloys, the solution treatment temperature may be within a range of 460° C.-500° C.

In some embodiments, the plurality of second temperature sensors 2 and the plurality of fifth temperature sensors 10 disposed on the two automated transfer and positioning devices may be the contact temperature sensors or the non-contact sensors. The contact temperature sensors may include the platinum resistance temperature sensors or the thermocouple sensors. The non-contact sensors may include the thin film type optical temperature sensor.

In some embodiments, a spacing between two adjacent second temperature sensors 2 of the plurality of second temperature sensors 2 on the automated transfer and positioning device may be within a range of 100 mm-150 mm. A spacing between two adjacent fifth temperature sensors 10 of the plurality of fifth temperature sensors 10 on the automated transfer and positioning device may be within a range of 100 mm-150 mm. For example, the spacing between two adjacent second temperature sensors 2 of the plurality of second temperature sensors 2 on the automated transfer and positioning device may be 100 mm, and two adjacent fifth temperature sensors 10 of the plurality of fifth temperature sensors 10 on the automated transfer and positioning device may be 100 mm. As another example, the spacing between two adjacent second temperature sensors 2 of the plurality of second temperature sensors 2 on the automated transfer and positioning device may be 150 mm, and two adjacent fifth temperature sensors 10 of the plurality of fifth temperature sensors 10 on the automated transfer and positioning device may be 150 mm. As another example, the spacing between two adjacent second temperature sensors 2 of the plurality of second temperature sensors 2 on the automated transfer and positioning device may be 125 mm, and two adjacent fifth temperature sensors 10 of the plurality of fifth temperature sensors 10 on the automated transfer and positioning device may be 125 mm. By setting the spacing between two adjacent second temperature sensors 2 of the plurality of second temperature sensors 2 on the automated transfer and positioning device and the spacing between two adjacent fifth temperature sensors 10 of the plurality of fifth temperature sensors 10 on the automated transfer and positioning device in a specific manner, the temperature information collected at different positions of the billet that completes the solution treatment or the workpiece that completes the first process in-die aging treatment can be received.

At the end of the billet positioning, the control system may perform the preliminary feedback control of the hot stamping press and the temperature controllable hot stamping die in the hot stamping and forming device based on the temperature information collected from the plurality of second temperature sensor 2 on the automated transfer and positioning device.

In some embodiments, the hot stamping and forming device may include the hot stamping press the temperature controllable hot stamping die, a plurality of third temperature sensors 4, a plurality of fourth temperature sensors 6, a displacement sensor 3, a speed sensor 7, and a first pressure sensor 5.

The hot stamping press refers to a machine that performs stamping and forming on a metal material at a high temperature. The hot stamping die refers a tool used to perform stamping and forming on the metal material.

The hot forming production system may perform hot stamping forming on the billet on the hot stamping press, ensuring that the billet forms the shape of a target workpiece while avoiding damage to the workpiece. At the beginning of hot stamping and forming, the control system may perform the preliminary feedback control of the hot stamping press and the hot stamping die based on the temperature information collected from the plurality of second temperature sensors 2 on the automated transfer and positioning device.

The plurality of third temperature sensors 4 and the plurality of fourth temperature sensors 6 on the hot stamping die may collect the temperature information of the billet and the hot stamping die in real time, respectively. The displacement sensor 3 on the hot stamping press may collect displacement information of an upper die 8 of the hot stamping die in real time. The speed sensor 7 may collect stamping speed information of the upper die 8 of the hot stamping die in real time. The plurality of third temperature sensors 4, the plurality of fourth temperature sensor 6, the displacement sensor 3, and the speed sensor 7 may input the temperature information, the displacement information, and the stamping speed information into the control system, respectively.

The displacement information may include a movement distance of the upper die 8 of the hot stamping die, or the like. The stamping speed information may include a stamping speed of the upper die 8 of the hot stamping die, or the like. The control system may calculate a deformation temperature and a strain rate of the billet alloy based on the collected temperature information, the displacement information, and the stamping speed information. The deformation temperature refers to a temperature at which a material begins to deform plastically in case of an external force or a high-temperature environment. The strain rate refers to a rate at which a linear or shear strain occurs per unit time.

The control system may also determine, based on the built-in constitutive model of the alloy and the built-in forming limit model of the alloy, whether an elongation of the alloy is higher than a deformation degree of the billet under the condition and whether a planar principal strain state of the alloy is in a safety zone under the current condition. The control system may obtain the elongation of the alloy under the corresponding condition based on the constitutive model of the alloy (e.g., a constitutive equation).

In response to the determining that the elongation of the alloy is higher than the deformation degree of the billet, and/or that the planar principal strain state of the alloy is not within the safety zone under the current condition, the control system may also perform a first operation to realize a corresponding feedback control of heating elements 9 of the hot stamping die and the upper die 8 of the hot stamping die and ensure that the billet forms the target workpiece without rupture. The first operation may include optimizing the temperature of the hot stamping die and the displacement and the stamping speed of the upper die 8 of the hot stamping die until the elongation of the alloy is less than the deformation degree of the billet and the planar principal strain state of the alloy is within the safety zone under the current condition. The control system may obtain the deformation degree of the billet through the built-in forming limit model. The safety zone under the current condition may be preset by those skilled in the art based on experience.

In some embodiments, a range of each the plurality of third temperature sensors 4 and each of the plurality of fourth temperature sensors 6 disposed on the hot stamping die may include the solution treatment temperature and the first process aging temperature of the aluminum alloy.

For the 2 xxx (Al—Cu, Al—Cu—Mg, and Al—Cu—Li) aluminum alloys, such as the 2219 aluminum alloy, the solution treatment temperature and the first process aging temperature may be within a range of 220° C.-535° C. For the 6xxx (Al—Mg—Si) aluminum alloys, such as the 6082 aluminum alloy, the solution treatment temperature and the first process aging temperature may be within a range of 210° C.-530° C. For the 7xxx (Al—Zn—Mg and Al—Zn—Mg—Cu) aluminum alloys, such as the 7075 aluminum alloy, the solution treatment temperature and the first process aging temperature may be within a range of 125° C.-485° C.

The plurality of third temperature sensors 4 and the plurality of fourth temperature sensors 6 may be the contact temperature sensors. The contact temperature sensors may include the platinum resistance temperature sensor or the thermocouple sensor. The plurality of third temperature sensors 4 may be configured to measure the temperature of the billet on the hot stamping die. The plurality of fourth temperature sensors 6 may be configured to measure the temperature of the hot stamping die.

A spacing between two adjacent third temperature sensors 4 of the plurality of third temperature sensors 4 on an operation surface of the hot stamping die may be within a range of 50 mm-150 mm, and a spacing between two adjacent fourth temperature sensors 6 of the plurality of fourth temperature sensors 6 on the operation surface of the hot stamping die may be within a range of 50 mm-150 mm, such that the temperature information at different positions of the billet and at different positions of the operation surface of the hot stamping die during the process of hot stamping and forming, in-die quenching, and the first process in-die aging treatment, respectively. For example, the spacing between two adjacent fourth temperature sensors 6 of the plurality of fourth temperature sensors 6 on the operation surface of the hot stamping die may be 50 mm. As another example, the spacing between two adjacent fourth temperature sensors 6 of the plurality of fourth temperature sensors 6 on the operation surface of the hot stamping die may be 100 mm. As another example, the spacing between two adjacent fourth temperature sensors 6 of the plurality of fourth temperature sensors 6 on the operation surface of the hot stamping die may be 150 mm.

In some embodiments, a spacing between two adjacent heating elements of the heating elements in a region close to the operation surface of the hot stamping die may be within a range of 50 mm-150 mm. When the processes of hot stamping and forming, the in-die quenching, and the first process in-die aging treatment are carried out on the hot stamping die and the temperature of the billet in the hot stamping die is non-uniform, the heating elements 9 at various positions of the hot stamping die may be adjusted to different power according to the different temperatures at various positions of the billet of the hot stamping die, so as to adjust the temperature distribution of the billet in time and ensure the uniformity of the billet. The region close to the operation surface of the hot stamping die may be preset by those skilled in the art based on experience. In some embodiments, the spacing between two adjacent heating elements of the heating elements in the region close the operation surface of the hot stamping die may be 50 mm. In some embodiments, the spacing between two adjacent heating elements of the heating elements in the region close the operation surface of the hot stamping die may be 100 mm. In some embodiments, the spacing between two adjacent heating elements of the heating elements in the region close the operation surface of the hot stamping die may be 150 mm.

In some embodiments, the displacement sensor 3 disposed on the hot stamping press may be a linear displacement sensor, and a range of the displacement sensor 3 may include a travel range of the upper die 8 of the hot stamping die. The travel range of the upper die 8 of the hot stamping die may be within a range of 1000 mm-1500 mm. The displacement sensor 3 may be a magnetic sensor or an optical sensor. The magnetic sensor may include a magnetostrictive detector. The optical sensor may include a prism or a reflective sensor. In some embodiments, the travel range of the upper die 8 of the hot stamping die may be 1000 mm. In some embodiments, the travel range of the upper die 8 of the hot stamping die may be 1250 mm. In some embodiments, the travel range of the upper die 8 of the hot stamping die may be 1500 mm.

In some embodiments, the speed sensor 7 disposed on the hot stamping die may be a linear speed sensor. A range of the speed sensor 7 may include a stamping speed range of the upper die 8 of the hot stamping die. The stamping speed range of the upper die 8 of the hot stamping die may be within a range of 100 mm/s-1000 mm/s. The speed sensor 7 may be the magnetic sensor or a photoelectric sensor. The magnetic sensor may include a Hall sensor. The photoelectric sensor may include a photoelectric interrupter. In some embodiments, the stamping speed of the upper die 8 of the hot stamping die may be 100 mm/s. In some embodiments, the stamping speed of the upper die 8 of the hot stamping die may be 500 mm/s. In some embodiments, the stamping speed of the upper die 8 of the hot stamping die may be 1000 mm/s.

The hot forming production system may also continue to carry out in-die quenching treatment on the workpiece on the hot stamping press to obtain a supersaturated solid solution structure, avoiding a coarse precipitated phase in a microstructure of the workpiece, and ensuring that the mechanical properties of the workpiece meet the corresponding requirements. The plurality of third temperature sensors 4 and the plurality of fourth temperature sensors 6 on the hot stamping die may collect the temperature information of the workpiece and the hot stamping die in real time. The first pressure sensor 5 on the hot stamping press may collect the clamping pressure information of the hot stamping die in real time. The plurality of third temperature sensors 4, the plurality of fourth temperature sensors 6, and the first pressure sensor 5 may input the temperature information and the clamping pressure information into the control system. The clamping pressure information may include a pressure value exerted by the hot stamping die on the workpiece during the clamping process, etc.

The control system may calculate a quenching rate of the workpiece based on the collected temperature information and the clamping pressure information. The control system may also determine whether the quenching rate at various positions of the workpiece is fast enough and uniform based on the built-in TTT model of the alloy and the built-in TTP model of the alloy. In response to determining that the quenching rate at various positions of the workpiece is not fast and uniform enough, the control system may also perform a second operation to achieve corresponding feedback control of the heating elements 9 of the hot stamping die and the upper die 8 of the hot stamping die, ensuring that there is no coarse precipitated phase in the microstructure of the workpiece, and the mechanical properties meet the corresponding requirements. The second operation may include optimizing the temperature and the clamping pressure of the hot stamping die until the quenching rate at various positions of the workpiece is fast enough and uniform.

The quenching rate refers to a rate at which steel or other metallic materials rapidly cool from a heating state to room temperature during the quenching process. In response to determining that the quenching rate at at various positions of the workpiece is greater than or equal to a rate threshold, the control system may determine that the quenching rate at various positions of the workpiece fast and uniform enough, or the control system may determine that the quenching rate at various positions of the workpiece is not fast and uniform enough. The corresponding requirements may be preset by those skilled in the art based on experience.

In some embodiments, a range of the first pressure sensor 5 disposed on the hot stamping press may include the clamping pressure range of the hot stamping press. The clamping pressure range of the hot stamping press may be within a range of 1000 KN-50000 KN. The first pressure sensor 5 may include a piezoelectric sensor.

The hot forming production system may continue to perform the first process in-die aging treatment on the workpiece on the hot stamping press to precipitate a relatively large precipitated phase from the matrix, and avoid simultaneous stress relaxation of the workpiece in case of under-aging or over-aging of the workpiece, reducing the resilience of the workpiece and improving the forming precision of the workpiece. A first process die refers to a device used to perform an aging treatment. The aging treatment refers to a treatment process for eliminating the internal stress of the workpiece, improving the mechanical properties, etc.

The plurality of third temperature sensors 4 and the plurality of fourth temperature sensors 6 on the hot stamping die may collect the temperature information of the workpiece and the hot stamping die in real time. The first pressure sensor 5 on the hot stamping die may collects th clamping pressure information of the hot stamping die in real time. The plurality of third temperature sensor 4, the plurality of fourth temperature sensor 6, and the first pressure sensor 5 may input the temperature information and the clamping pressure information into the control system, respectively. The control system may determine whether the temperature at the various positions of the workpiece uniformly reaches and maintains at the first process aging temperature, and whether the aging time meets the corresponding requirements based on the collected temperature information and the collected clamping pressure information, and the built-in TTT model of the alloy, the TTP model of the alloy, and the yield strength model of the alloy.

In response to determining that the temperature at the various positions of the workpiece does not uniformly reach and maintain at the first process aging temperature, and/or the aging time does not meet the corresponding requirements, the control system may also perform a third operation to realize the corresponding feedback control of the heating elements 9 of the hot stamping die and the upper die 8 of the hot stamping die to ensure that the microstructure and the mechanical properties of the workpiece meet the corresponding requirements. The third operation may include optimizing the temperature and the clamping pressure of the hot stamping die and the maintenance time until the temperature at various positions of the workpiece uniformly reaches and maintains at the first process aging temperature, and the aging time reaches the corresponding requirements.

The corresponding requirements may be preset by those skilled in the art based on experience, such as the aging time reaching an aging time threshold. The aging time threshold may be preset by those skilled in the art based on experience.

In some embodiments, for the 2xxx (Al—Cu, Al—Cu—Mg, and Al—Cu—Li) aluminum alloys, such as the 2219 aluminum alloy, a first process aging condition may be 220° C.-240° C.×5 min. The first process aging condition of 220° C.-240° C.×5 min means that the first process aging temperature may be within a range of 220° C.-240° C., and the aging time meeting the corresponding requirements may be 5 min. The meaning of the first process aging condition may be similar in the present disclosure below.

For the 6xxx (Al—Mg—Si) aluminum alloys, such as the 6082 aluminum alloy, the first process aging condition may be 210° C.×30 min-55 min. For the 7xxx (Al—Zn—Mg and Al—Zn—Mg—Cu) aluminum alloys, such as the 7075 aluminum alloy, the first process aging condition may be 125° C.-135° C.×10 min.

At the end of the first process in-die aging treatment, the control system may also perform the preliminary feedback control of the automated transfer and positioning device based on the temperature information received from the plurality of third temperature sensors 4 on the hot stamping die.

In some embodiments, the hot forming production system may rapidly transfer and position the workpiece completing the first process in-die aging treatment from the hot stamping press to an aging press using the automated transfer and positioning device to avoid temperature dissipation of the workpiece caused by uncertainty of the workshop environment. At the beginning of the transfer and positioning, the control system may perform preliminary feedback control of the automated transfer and positioning device based on the temperature information received from the plurality of third temperature sensors 4 on the hot stamping die.

For example, the plurality of second temperature sensor 2 or the plurality of fifth temperature sensor 10 on the automated transfer and positioning device may collect the temperature information of the workpiece in real time and input the temperature information into the control system. The control system may determine whether the transfer and the positioning speed is fast enough based on the collected temperature information. In response to determining that the transfer and the positioning speed is not fast enough, the control system may also perform a fourth operation to realize the corresponding feedback control of the automated transfer and positioning device, ensuring that the workpiece is rapidly transferred and positioned from the hot stamping press to the aging press. The fourth operation may include optimizing the transfer and the positioning speed of the automated transfer and positioning device until the transfer and the positioning speed is fast enough. In response to determining that the transfer and the positioning speed is greater than a speed threshold, the control system may determine that the transfer and the positioning speed is fast enough, or the control system may determine that the transfer and the positioning speed is not fast enough.

At the end of the workpiece positioning, the control system may perform preliminary feedback control of the aging press and the aging die based on the temperature information collected from the plurality of second temperature sensors 2 or the plurality of fifth temperature sensors 10 on the automated transfer and positioning device.

In some embodiments, the plurality of fifth temperature sensors 10 may be disposed on the automated transfer and positioning device. In response to determining that two automated transfer and positioning devices are provided in the hot forming production system, a range of each of the plurality of fifth temperature sensors 10 may include the first process aging temperature of the aluminum alloy.

For the 2xxxx (Al—Cu, Al—Cu—Mg, and Al—Cu—Li) aluminum alloys, such as the 2219 aluminum alloy, the first process aging temperature may be within a range of 220° C.-240° C. For the 6xxxx (Al—Mg—Si) aluminum alloys, such as the 6082 aluminum alloy, the first process aging temperature may be 210° C. For the 7xxxx (Al—Zn—Mg and Al—Zn—Mg—Cu) aluminum alloys, such as the 7075 aluminum alloy, the first process aging temperature may be within a range of 125° C.-135° C.

The hot forming production system may perform a second process in-die aging treatment on the workpiece on an aging press of the in-die aging device to obtain a microstructure in which a relatively large precipitated phase and a relatively small precipitated phase coexist in the matrix, avoiding under-aging or over-aging of the workpiece and stress relaxation of the workpiece, and reducing the springback and improving the forming precision of the workpiece.

In some embodiments, the in-die aging device may include the aging press, a temperature controllable aging die, a plurality of sixth temperature sensors 12, a plurality of seventh temperature sensors 14, and a second pressure sensor 13. The aging press refers to a press used to perform the aging treatment. The aging die refers to a die used to perform the aging treatment. At the beginning of the second process in-die aging treatment, the control system may perform preliminary feedback control of the aging press and the aging die based on the temperature information collected from the plurality of second temperature sensors 2 or the plurality of fifth temperature sensors 10 on the automated transfer and positioning device.

Specifically, the plurality of sixth temperature sensors 12 and the plurality of seventh temperature sensors 14 on the aging die may collect the temperature information of the workpiece and the aging die in real time, respectively. The second pressure sensor 13 on the aging press may collect clamping pressure information of the aging die in real time, and input the temperature information and the clamping pressure information into the control system. The control system may determine whether the temperature at various positions of the workpiece uniformly reaches and maintains at a second aging temperature, and whether the aging time meets the corresponding requirements based on the collected temperature information and the collected pressure information, and the built-in TTT model of the alloy, the TTP model of the alloy, and the yield strength model of the alloy.

In response to determining that the temperature at various positions of the workpiece does not uniformly reach and maintain at the second aging temperature, and the aging time does not meet the corresponding requirements, the control system may perform a fifth operation to achieve corresponding feedback control of heating elements 15 of the aging die and an upper die 11 of the aging die, or terminate the process of second process in-die aging, to ensure that the microstructure and the mechanical properties of the workpiece meet the corresponding requirements. The second process aging temperature and the corresponding requirements may be preset by those skilled in the art based on experience. The fifth operation may include optimizing the temperature and the clamping pressure of the aging die, and the maintenance time until the temperature at various positions of the workpiece uniformly reaches and maintains at the second process aging temperature, and the aging time meets the corresponding requirements.

In some embodiments, a range of each of the plurality of sixth temperature sensors 12 and each of the plurality of seventh temperature sensors 14 on the aging die may include the second process aging temperature of the aluminum alloy. For the 2xxxx (Al—Cu, Al—Cu—Mg, and Al—Cu—Li) aluminum alloys, such as the 2219 aluminum alloy, the second process aging condition may be 175° C.×4 h. The second process aging condition of 175° C.×4 h means that the second process aging temperature may be 175° C., and the aging time meeting the corresponding requirements may be 4 h. The meaning of a second process aging condition may be similar in the present disclosure below.

For the 6xxxx (Al—Mg—Si) aluminum alloys, such as the 6082 aluminum alloy, the second process aging condition may be 180° C.×30 min. For the 7xxxx (Al—Zn—Mg and Al—Zn—Mg—Cu) aluminum alloys, such as the 7075 aluminum alloy, the second process aging condition may be 180° C.×30 min. The plurality of sixth temperature sensors 12 and the plurality of seventh temperature sensors 14 may be the contact temperature sensors. The contact temperature sensors may include the platinum resistance temperature sensor or the thermocouple sensor. The plurality of sixth temperature sensors 12 may be configured to measure the temperature of the billet on the aging die. The plurality of seventh temperature sensor 14 may be configured to measure the temperature of the die.

A spacing between two adjacent sixth temperature sensors 12 of the plurality of sixth temperature sensors 12 on an operation surface of the aging die may be within a range of 50 mm-150 mm, and a spacing between two adjacent seventh temperature sensors 14 of the plurality of seventh temperature sensors 14 on the operation surface of the aging die may be within a range of 50 mm-150 mm, such that the temperature informations at different positions of the billet and at different positions of the operation surface of the die may be received, respectively.

In some embodiments, a spacing between two adjacent heating elements 15 of the aging die in a region close to the operation surface of the die may be within a range of 50 mm-150 mm such that when the temperature of the workpiece is not uniform, the heating elements at various positions may be adjusted to different power according to the temperature at various positions of the billet, to adjust the temperature distribution of the billet to ensure the uniformity. The heating elements 15 of the aging die refer to heating elements disposed on the aging die, such as a resistance wire, or the like.

In some embodiments, a range of the second pressure sensor 13 disposed on the aging press may include a clamping pressure range of the aging press. The clamping pressure range of the aging press may be within a range of 1000 KN-50000 kN. The second pressure sensor 13 may include the piezoelectric sensor. In some embodiments, the clamping pressure of the aging press may be 1000 kN. In some embodiments, the clamping pressure of the aging press may be 50000 kN. In some embodiments, the clamping pressure of the aging press may be 25000 kN.

Therefore, according to some embodiments of the present disclosure, the multi-sensor-based hot forming production system for the aluminum alloy sheet metal part and the control method thereof have the following beneficial effects.

(1) The aluminum alloy product produced by the hot forming production system has high stability and high yield. In the process of solution treatment and transfer and positioning, by monitoring the temperature of the billet in real time, the control system performs preliminary feedback control of the heating elements of the environmental heating furnace and the automated transfer and positioning devices to ensure that the heat dissipation of the billet at the beginning of the hot forming process is low. During the process of hot press forming, by monitoring the temperature of the billet in real time, the temperature of the hot stamping die, and the displacement and the stamping speed of the upper die 8 of the hot stamping die, the control system performs the corresponding feedback control of the heating elements 9 of the hot stamping die and the upper die 8 of the hot stamping die based on the constitutive model of the alloy and the forming limit model of the alloy, ensuring the formability of the alloy and avoiding damage to the alloy. In the process of in-die quenching and the first process in-die aging treatment, by monitoring the temperature of the workpiece and the temperature and the clamping pressure of the hot stamping die, the control system performs the corresponding feedback control of the heating elements 9 of the hot stamping die and the upper die 8 of the hot stamping die based on the TTT model of the alloy and the TTP model of the alloy, avoiding the precipitation of the coarse precipitated phase and thus ensuring that the mechanical properties of the workpiece meet the corresponding requirements. In the second process in-die aging treatment, by monitoring the temperatures of the workpiece and the temperature of the aging die in real time, the control system performs preliminary feedback control of the heating elements 15 of the aging die and the upper die of the aging die based on the TTT model of the alloy, the TTP model of the alloy, and the yield strength model of the alloy, ensuring the uniformity and stability of the mechanical properties of the workpiece.

(2) The hot forming production system has high adaptability. The control system obtains the elongation of the alloy under the corresponding condition according to the constitutive equation of the alloy, and then optimize the temperature of the hot stamping die and the stamping speed of the upper die 8 of the hot stamping die. The control system obtains the quenching rate and the aging temperature of the workpiece according to the TTT model of the alloy and the TTP model of the alloy, and then optimizes the temperature and the clamping pressure of the hot stamping die, which can be achieved by only inputting the corresponding material model in the control system, so as to be applicable to the production of different shapes of workpieces with different types of aluminum alloys.

(3) The hot forming production system has high productivity. The control system obtains the parameters such as the deformation temperature, the deformation rate, the quenching rate, the aging temperature, and the aging time according to the target mechanical properties of the alloy, thereby obtaining the optimum process parameters of each implementation device for each process step of the whole production line within the shortest time, and obtaining the target workpiece with the optimum forming quality and the optimum mechanical properties.

Embodiment 2

Figure 2:
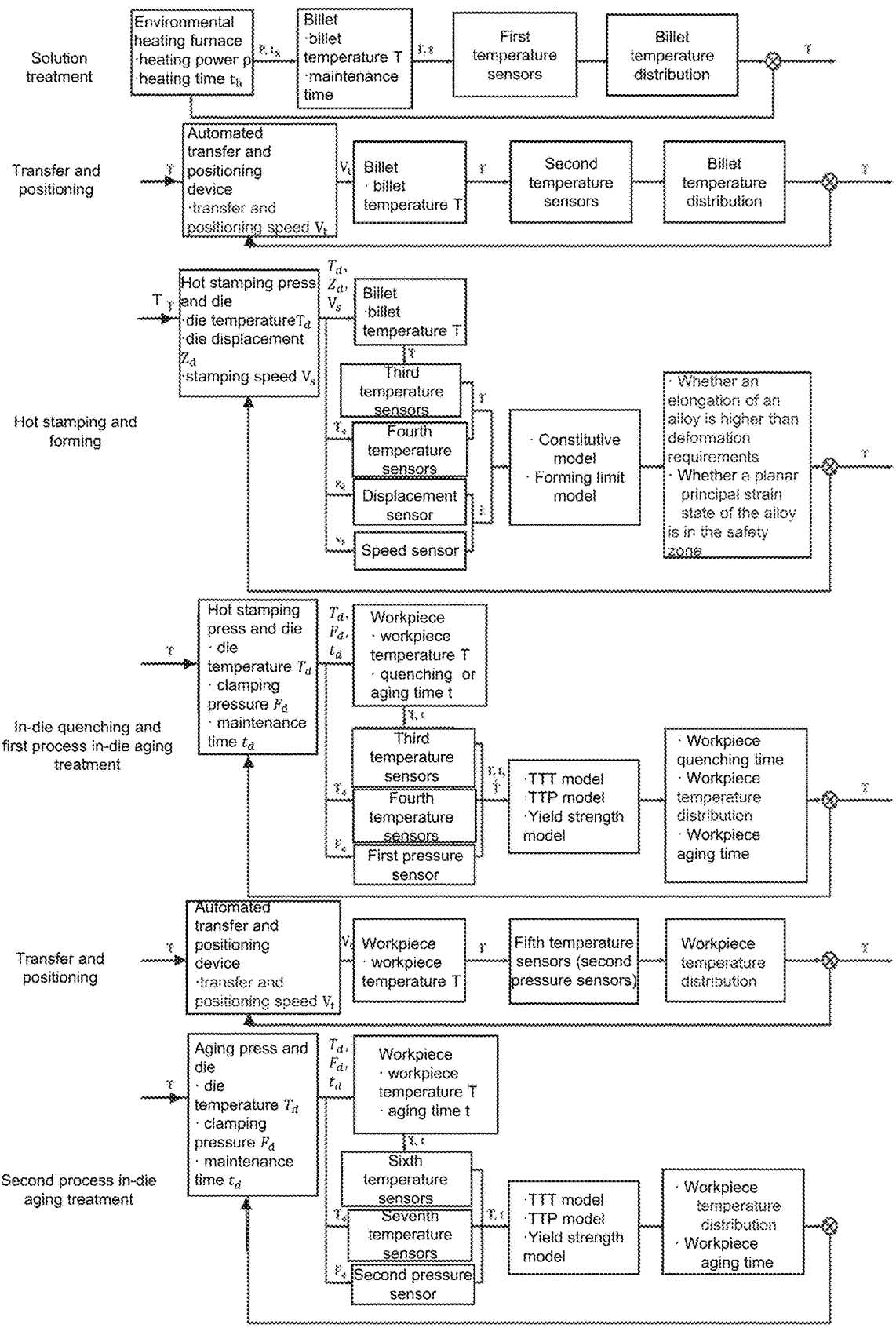
FIG. 2 is a schematic diagram illustrating a correspondence and a closed-loop feedback mechanism of functional devices used, process parameters involved, and corresponding sensors for each process step in a multi-sensor control process of aluminum alloy sheet metal forming according to some embodiments of the present disclosure.

FIG. 2 is a schematic diagram illustrating a correspondence and a closed-loop feedback mechanism of functional devices used, process parameters involved, and corresponding sensors for each process step in a multi-sensor control process of aluminum alloy sheet metal forming according to some embodiments of the present disclosure.

During the entire hot forming production process for the aluminum alloy sheet metal part, each sensor may collect corresponding information in real time and input the information into a control system. The information may include temperature information, displacement information, stamping speed information, clamping pressure information, or the like. More descriptions regarding the temperature information, the displacement information, the stamping speed information, and the clamping pressure information may be found in the related descriptions of FIG. 1.

The control system may perform corresponding determination based on a built-in alloy material model, optimize relevant parameters, and perform feedback control of corresponding functional device. The control system may also use a condition at the end of each process step as a preliminary condition for the next process step to perform preliminary feedback control of the functional devices for the next process step. The alloy material model may include a constitutive model, a forming limit model, a TTT model, a TTP model, and a yield strength model of the alloy. More descriptions regarding the relevant parameters may be found in related descriptions of FIG. 1.

The feedback control process may include the following specific operations.

1, a solution treatment may be performed on a billet using an environmental heating furnace. The environmental heating furnace may heat the billet for a duration of t h at a power P such that the temperature of the billet reaches T and the maintenance time is t. The t of the "t h" denotes the value of the duration, h denotes the duration in hours, P denotes the value of the power, and T denotes the value of the temperature. The magnitudes of the values of T, P, and t may be preset by those skilled in the art based on experience. The temperature of the billet and the maintenance time may be collected in real time by the plurality of first temperature sensors 1 disposed in the environmental heating furnace and input to the control system. The control system may determine, based on the collected temperature information and time information, whether the temperature at various positions of the billet uniformly reaches and maintains at a solution treatment temperature and whether solution treatment time meets the corresponding requirements.

In response to determining that the temperature at various positions of the billet does not uniformly reach and maintain at the solution treatment temperature and/or the solution treatment time does not meet the corresponding requirements, the control system may optimize the heating power P and the heating duration th of the environmental heating furnace until the temperature at various positions of the billet uniformly reaches and maintains at the solution treatment temperature, and the solution treatment time meets the corresponding requirements, so as to realize the corresponding feedback control of the environmental heating furnace, and ensure that the temperature at various positions of the billet rapidly reaches the solution treatment temperature and maintains for a certain time period. The temperature at various positions of the billet uniformly reaching and maintaining at the solution treatment temperature may be understood as that the temperature at various positions of the billet is basically the same and maintained at the solution treatment temperature.

More descriptions regarding the control system, the solution treatment temperature, the corresponding requirements, and the determination of whether the temperature at various positions of the billet uniformly reaches and maintains at the solution treatment temperature may be found in the related descriptions of FIG. 1. At the end of the solution treatment, the temperature T of the billet may be output as a preliminary condition for the next process step.

2, the billet completing the solution treatment may be rapidly transferred from the environmental heating furnace to a hot stamping press and positioned using an automated transfer and positioning device. The control system may perform, based on the input temperature T of the billet, preliminary feedback control of the automated transfer and positioning device to transfer and position the billet at a rate of vt such that the temperature of the billet reaches the temperature T.

The temperature T of the billet may be collected in real time by the plurality of second temperature sensors 2 on the automated transfer and positioning device and input into the control system. The control system may determine, based on the collected temperature information, whether the transfer and the positioning speed is fast enough, and optimize, in response to determining that the transfer and the positioning speed is not fast enough, the transfer and the positioning speed vt until the transfer and the positioning speed is fast enough to realize corresponding feedback control of the automated transfer and positioning device, ensuring rapid transfer and positioning of the billet from the environmental heating furnace to the hot stamping press. vt denotes the value of the transfer and the positioning speed, which may be preset by those skilled in the art based on experience.

More descriptions regarding the process of determining whether the transfer and the positioning speed is fast enough may be found in the related descriptions of FIG. 1. At the end of the transfer and the positioning process, the temperature T of the billet may be output as the preliminary condition for the next process step. More descriptions regarding the automated transfer and positioning device may be found in the related descriptions of FIG. 1.

3, hot stamping and forming may be performed the billet on a hot stamping press. The control system may perform, based on the input temperature T of the billet, preliminary feedback control of the hot stamping press and the hot stamping die such that hot stamping and forming may be performed on the billet with a die temperature of Td, a die displacement of zd, and a stamping speed of vs, and the temperature of the billet reaches the temperature T. The values of T, Td, zd, vs, and T may be preset by those skilled in the art based on experience. The temperature T of the billet may be understood as a deformation temperature T. The billet temperature, the die temperature, the die displacement, the stamping speed, and the temperature of the billet may be collected in real time by the plurality of fourth temperature sensors 6 on the hot stamping die, the displacement sensor 3 on the hot stamping press, the speed sensor 7 on the hot stamping press, and the plurality of third temperature sensors 4 on the hot stamping die, respectively, and input into the control system.

The control system may calculate the deformation temperature T and a strain rate of the alloy based on the collected temperature information, the collected displacement information, and the collected stamping speed information. The control system may determine, based on the built-in constitutive model of the alloy and the built-in forming limit model of the alloy, whether the elongation of the alloy is higher than a deformation degree of the billet under the condition and whether a planar principal strain state of the alloy is within a safety zone under the current condition.

The safety zone may be preset by those skilled in the art based on experience. The safety zone under the current condition may be preset by those skilled in the art based on experience. In response to determining that the elongation of the alloy is higher than the deformation degree of the billet, and/or that the planar principal strain state of the alloy is not within the safety zone under the current condition, the control system may optimize the die temperature Td, the die displacement zd, and the stamping speed vs until the elongation of the alloy is lower than the deformation degree of the billet and the planar principal strain state of the alloy is within the safety zone under the current condition, thereby achieving corresponding feedback control of the hot stamping press and the hot stamping die, and ensuring that the billet forms the target workpiece without rupture.

At the end of hot stamping and forming, the temperature T of the workpiece may be output as the preliminary condition for the next process step. More descriptions regarding the hot stamping press, the hot stamping die, the determination of whether the elongation of the alloy under the condition is higher than the deformation degree of the billet, and whether the planar principal strain state of the alloy is within the safety zone under the current condition may be found in the related descriptions of FIG. 1.

4, the in-die quenching and the first process in-die aging treatment may be performed on the workpiece on the hot stamping press. The control system may perform, based on the input temperature T of the billet, preliminary feedback control of the hot stamping press and the die to realize the in-die quenching and the first process in-die aging treatment on the workpiece with a die temperature of Td and a clamping pressure of Fd for the time of td such that the temperature of the workpiece is the temperature T and the quenching or aging time is the time t. The values of Td, Fd, td, T, and t may be preset by those skilled in the art based on experience. The billet temperature, the die temperature, the die displacement, the stamping speed, and the temperature of the workpiece may be respectively collected by the plurality of fourth temperature sensors 6 on the hot stamping die, the first pressure sensor 5 on the hot stamping press, and the plurality of third temperature sensors 4 on the hot stamping die, in real time and inputted into the control system.

The control system may calculate the temperature T of the workpiece, a temperature change rate of the workpiece, and the quenching or aging time t of the alloy based on the collected temperature information, the collected pressure information, and the collected time information. The control system may also determine whether a first condition is met based on the built-in TTT model of the alloy, the built-in TTP model of the alloy, and the built-in yield strength model of the alloy. The first condition may include whether the quenching rate at various positions of the workpiece during the in-die quenching process is fast and uniform enough, whether the temperature at various positions of the workpiece during the first process in-die aging treatment uniformly reaches and maintains at the first process aging temperature, and whether the aging time meets the corresponding requirements.

In response to determining that the first condition is satisfied, the control system may optimize the die temperature Td, the clamping pressure Fd, and the maintenance time td until the first condition is not satisfied, to realize corresponding feedback control of the hot stamping press and the die, ensuring that the microstructure and the mechanical properties of the workpiece meet the corresponding requirements. The first condition being satisfied may include that the quenching rate at various positions of the workpiece during the in-die quenching process is not fast and uniform enough, that the temperature at various positions of the workpiece during the first process in-die aging treatment does not uniformly reach and maintain at the first process aging temperature, and/or that the aging time does not meet the corresponding requirements. The first condition being not satisfied may include that the quenching rate of the workpiece at various positions during the in-die quenching process is fast and uniform enough, the temperature at various positions of the workpiece during the first process in-die aging treatment uniformly reaches and maintains at the first process aging temperature, and/or the aging time meets the corresponding requirements.

More descriptions regarding determining whether the quenching rate at various positions of the workpiece is fast and uniform enough during the in-die quenching process, whether the temperature at various positions of the workpiece during the first process in-die aging treatment uniformly reaches and maintains at the first process aging temperature, and whether the aging time meets the corresponding requirements may be found in the related descriptions of FIG. 1. At the end of the in-die quenching and the first process in-die aging treatment, the temperature T of the workpiece may be output as the preliminary condition for the next process step.

5, the workpiece completing the first process in-die aging treatment may be rapidly transferred and positioned from the hot stamping press to the aging press using the automated transfer and positioning device. The control system may perform preliminary feedback control of the automated transfer and positioning device based on the input temperature T of the workpiece to transfer and position the workpiece at a speed vt such that the temperature of the workpiece reaches the temperature T. The value of vt may be preset by those skilled in the art based on experience.

In response to determining that two automated transfer and positioning devices are provided in the hot forming production system, the temperature T of the workpiece may be collected in real time by the plurality of fifth temperature sensors 10 on the two automated transfer and positioning devices and input into the control system. In response to determining that one automated transfer and positioning device is provided in the hot forming production system, the temperature T of the workpiece may be collected in real time by the plurality of second temperature sensor 2 on the automated transfer and positioning device and input into the control system. The control system may determine, based on the collected temperature information, whether the transfer and the positioning speed is fast enough, and optimize, in response to determining that the transfer and the positioning speed is not fast enough, the transfer and the positioning speed vt until the transfer and the positioning speed is fast enough to realize corresponding feedback control of the automated transfer and positioning device, ensuring fast transfer and positioning of the workpiece from the hot stamping press to the aging press.

More descriptions regarding the automated transfer and positioning device and determining whether the transfer and the positioning speed is fast enough may be found in the related descriptions of FIG. 1. At the end of the transfer and the positioning process, the temperature T of the workpiece may be output as the preliminary condition for the next process step.

6, a second process in-die aging treatment may be performed on the workpiece on the aging press. The control system may perform, based on the input temperature T of the billet, preliminary feedback control of the aging press and the aging die, such that the second process in-die aging treatment may be on the workpiece with a die temperature of Td and a clamping pressure of Fd in time of td, making the temperature of the workpiece reach the temperature T and the aging time reach t. The billet temperature, the die temperature, the die displacement, the stamping speed, and the temperature of the workpiece may be respectively collected in real time by the plurality of seventh temperature sensors 14 on the aging die, the plurality of second pressure sensors 13 on the aging press, and the plurality of sixth temperature sensors 12 on the aging die and inputted into the control system.

The control system may determine, based on the collected temperature information, the collected pressure information, and the collected time information, and the built-in TTT model of the alloy, the built-in TTP model of the alloy, and the built-in yield strength model of the alloy, whether the temperature at various positions of the workpiece uniformly reaches and maintains at a second aging temperature, and whether the aging time meets the corresponding requirements. In response to determining that the temperature at various positions of the workpiece does not uniformly reach and maintain at the second aging temperature and the aging time does not meet the corresponding requirements, the control system may optimize the die temperature Td, the clamping pressure Fd, and the maintenance time td, and perform corresponding feedback control of the aging press and the aging die or terminate the process of the second process in-die aging treatment, to ensure that the microstructure and the mechanical properties of the workpiece meet the corresponding requirements. The second aging temperature, and the corresponding requirements may be preset by those skilled in the art based on experience. More descriptions regarding the aging press and the aging die may be found in the related descriptions off FIG. 1.

Embodiment 3

Figure 3:
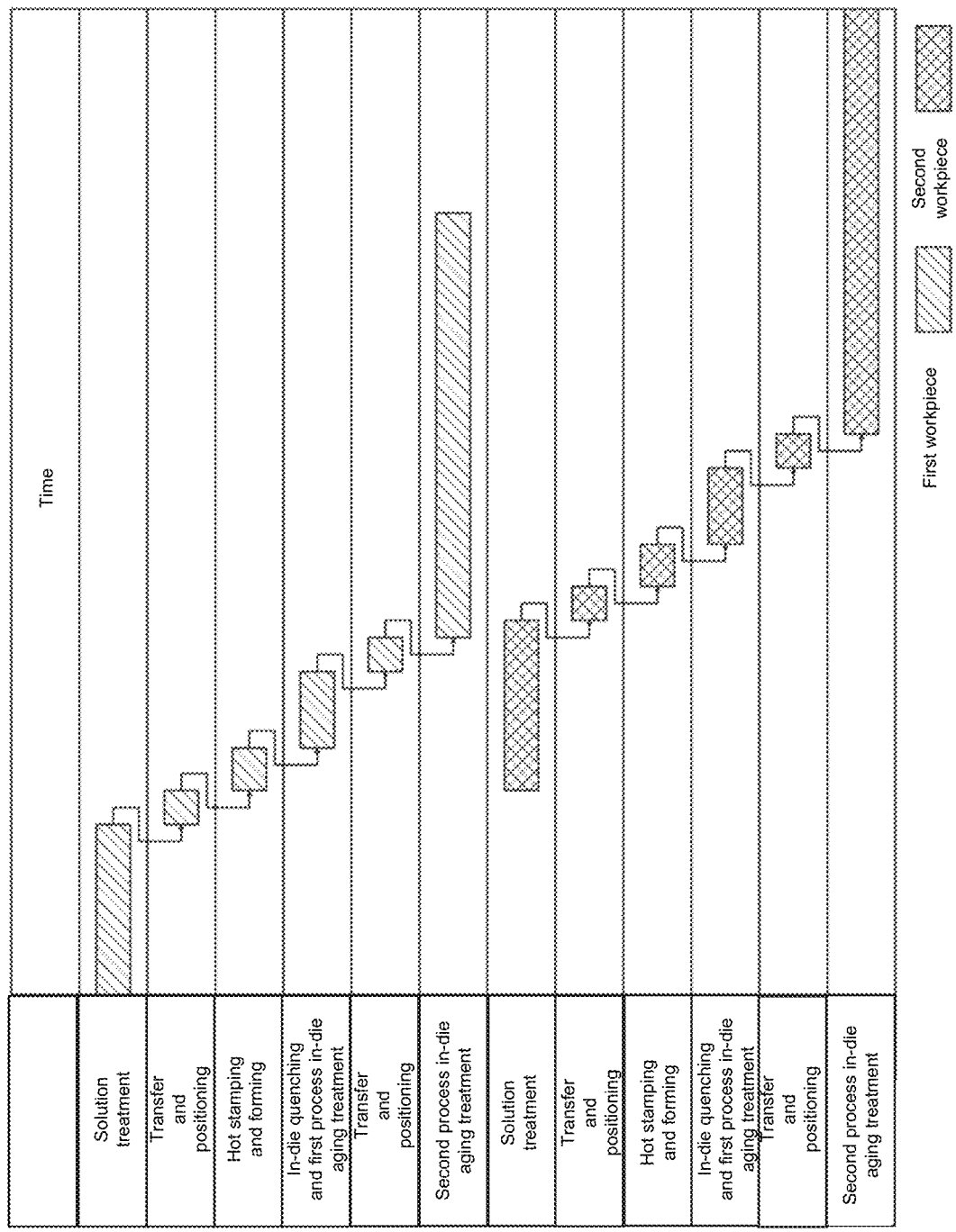
FIG. 3 is a schematic diagram illustrating a production takt of a production system during an actual production process of aluminum alloy hot forming according to some embodiments of the present disclosure.

FIG. 3 is a schematic diagram illustrating a production takt of a production system during an actual production process of aluminum alloy hot forming according to some embodiments of the present disclosure. When a previous billet starts hot stamping and forming and in-die quenching, a next billet may start a solution treatment, and so on, thereby achieving a production takt of small batch customized production. The specific process of the production takt may include the following operations.

1, the solution treatment may be performed on the billet using an environmental heating furnace. More description regarding the environmental heating furnace may be found in the related descriptions of FIG. 1.

2, the billet completing the solution treatment may be rapidly transferred from the environmental heating furnace to a hot stamping press and positioned using an automated transfer and positioning device. More description regarding the automated transfer and positioning device and the hot stamping press may be found in the related descriptions of FIG. 1.

3, hot stamping and forming may be performed on the billet on the hot stamping press, at the same time the solution treatment may be performed on the next billet using the environmental heating furnace.

4, in-die quenching and a first process in-die aging treatment of the workpiece may be continued on the hot stamping press, then the workpiece completing the first process in-die aging treatment may be rapidly transferred from the hot stamping press to an aging press using the automated transfer and positioning device, and then a second process in-die aging treatment may be performed on the workpiece on the aging press, wherein the next billet may complete the solution treatment after the first workpiece starts the second process in-die aging treatment for a period of time.

5, the next billet completing the solution treatment may be rapidly transferred and positioned from the environmental heating furnace to the hot stamping press using the automated transfer and positioning device, and the mass production of the workpiece may be realized by repeating the process of the operations 3-5.

Embodiment 4

Figure 4:
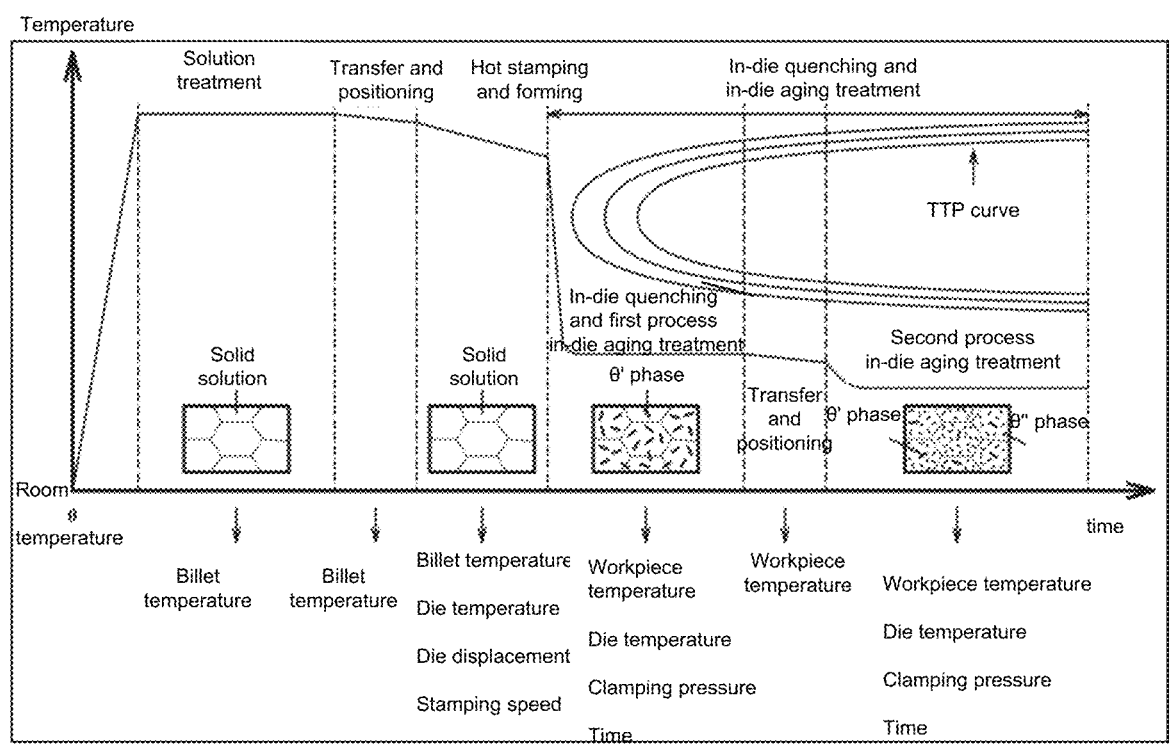
FIG. 4 is a schematic diagram illustrating a temperature control process of a 2219 aluminum alloy billet or workpiece in a hot stamping production system and a corresponding microstructural evolution according to some embodiments of the present disclosure.

FIG. 4 is a schematic diagram illustrating a temperature control process of a 2219 aluminum alloy billet or workpiece in a hot stamping production system and a corresponding microstructural evolution according to some embodiments of the present disclosure.

The temperature control process of the 2219 aluminum alloy billet or workpiece in the hot stamping production system and the corresponding microstructural evolution of FIG. 4 may include the following operations.

1, solution treatment may be performed on the 2219 aluminum alloy billet using an environmental heating furnace. Specifically, the plurality of first temperature sensors 1 in the environmental heating furnace may collect temperature information of the 2219 aluminum alloy billet in real time, and obtain time information by performing timing at the same time, and input the temperature information and the time information into the control system.

The control system may determine, based on the collected temperature information and the collected time information, whether the temperature at various positions of the 2219 aluminum alloy billet uniformly reaches and maintains at 535° C., and whether solution treatment time reaches 30 min. In response to determining that the temperature at various positions of the 2219 aluminum alloy billet does not uniformly reach and maintain at 535° C., and/or the solution treatment time does not reach 30 min, the control system may optimize the heating temperature and the maintenance time of the environmental heating furnace until the temperature at various positions of the 2219 aluminum alloy billet uniformly reaches and maintains at 535° C., and the solution treatment time reaches 30 min, to achieve corresponding feedback control of heating elements of the environmental heating furnace, ensuring that the temperature at various positions of the 2219 aluminum alloy billet rapidly reaches 535° C. and maintains for 30 min.

During the solution treatment process, the microstructure of the 2219 aluminum alloy may be gradually transformed into a homogeneous solid solution structure. At the end of the solution treatment, the control system may perform preliminary feedback control of an automated transfer and positioning device based on the temperature information received from the plurality of first temperature sensors 1 in the environmental heating furnace.

2, the 2219 aluminum alloy billet completing the solution treatment may be rapidly transferred from the environmental heating furnace to a hot stamping press and positioned using the automated transfer and positioning device. At the beginning of the transfer and positioning, the control system may perform preliminary feedback control of the automated transfer and positioning device based on the temperature information received from the plurality of first temperature sensors 1 in the environmental heating furnace.

The plurality of second temperature sensors 2 on the automated transfer and positioning device may collects the temperature information of the 2219 aluminum alloy billet in real time and input the temperature information into the control system. The control system may determine, based on the collected temperature information, whether the transfer and the positioning speed is fast enough, and optimize, in response to determining that the transfer and the positioning speed is not fast enough, the transfer and the positioning speed of the automated transfer and positioning device until the transfer and the positioning speed is fast enough to realize corresponding feedback control of the automated transfer and positioning device, ensuring the rapid transfer and positioning of the 2219 aluminum alloy billet from the environmental heating furnace to the hot stamping press.

More descriptions regarding determining whether the transfer and the positioning speed is fast enough may be found in the related descriptions of FIG. 1. During the process of transfer and the positioning, a temperature drop of the 2219 aluminum alloy billet is small due to the short time period, and there is no significant change in the microstructure of the 2219 aluminum alloy billet. At the end of the positioning of the 2219 aluminum alloy billet, the control system may perform, based on the temperature information collected from the plurality of second temperature sensors 2 on the automated transfer and positioning device, preliminary feedback control of the hot stamping press and a hot stamping die.

3, hot stamping and forming may be performed on the 2219 aluminum alloy on the hot stamping press. At the beginning of the hot stamping and forming, the control system may perform preliminary feedback control of the hot stamping press and the hot stamping die based on the temperature information collected from the plurality of second temperature sensors 2 on the automated transfer and positioning device.

The control system may be provided with a built-in constitutive model of the 2219 aluminum alloy, a forming limit model of the 2219 aluminum alloy, a TTT model of the 2219 aluminum alloy, a TTP model of the 2219 aluminum alloy, and a yield strength model of the 2219 aluminum alloy. The plurality of third temperature sensors 4 and the plurality of fourth temperature sensors 6 on the hot stamping die may collect temperature information of the 2219 aluminum alloy billet and the hot stamping die in real time. The displacement sensor 3 disposed on the hot stamping press may collect displacement information of an upper die of the hot stamping die in real time. The speed sensor 7 disposed on the hot stamping press may collect stamping speed information of the upper die of the hot stamping die in real time. The plurality of third temperature sensors 4, the plurality of fourth temperature sensors 6, the displacement sensor 3, and the speed sensor 7 may input the temperature information, the displacement information, and the stamping speed information into the control system, respectively. The control system may calculate a deformation temperature and a strain rate of the 2219 aluminum alloy based on the collected temperature information, the collected displacement information, and the collected stamping speed information. The control system may determine, based on the built-in constitutive model of the 2219 aluminum alloy and the built-in forming limit model of the 2219 aluminum alloy, whether an elongation of the 2219 aluminum alloy under the condition is higher than a deformation degree of the 2219 aluminum alloy billet, and whether a planar principal strain state of the 2219 aluminum alloy is within a safety zone under the current condition. In response to the determining that a preset condition is satisfied, the control system may optimize the temperature of the hot stamping die, the displacement and the stamping speed of the upper die 8 of the hot stamping die until the preset condition is not satisfied, to realize corresponding feedback control of the heating elements 9 of the hot stamping die and the upper die 8 of the hot stamping die, ensuring that the 2219 aluminum alloy billet forms a target workpiece without rupture. The preset condition being satisfied may include that the elongation of the 2219 aluminum alloy is higher than the deformation degree of the 2219 aluminum alloy billet under the current condition and/or the planar principal strain state of the 2219 aluminum alloy is not within the safety zone under the current condition. More descriptions regarding determining whether the elongation of the 2219 aluminum alloy is higher than the deformation degree of the 2219 aluminum alloy billet under the current condition and whether the planar principal strain state of the 2219 aluminum alloy is within the safety zone under the current condition may be found in the related descriptions of FIG. 1. During the process of hot stamping and forming, the temperature drop of the 2219 aluminum alloy billet may be greater than that during the transfer process but much less than that during the quenching process, and the microstructure of the aluminum alloy billet may essentially remain in a solid solution state.

4, in-die quenching of the 2219 aluminum alloy workpiece on the hot stamping press may be continued. The plurality of third temperature sensors 4 and the plurality of fourth temperature sensors 6 on the hot stamping die may collect temperature information of the 2219 aluminum alloy workpiece and the hot stamping die in real time. The first pressure sensor 5 on the hot stamping press may collect clamping pressure information of the hot stamping die and input the temperature information into the control system. The control system may calculate a quenching rate of the 2219 aluminum alloy workpiece based on the collected temperature information and the collected pressure information. The control system may also determine, based on the built-in TTT model of the 2219 aluminum alloy and the built-in TTP model of 2219 aluminum alloy, whether the quenching rate at various positions of the 2219 aluminum alloy workpiece is fast and uniform enough. In response to determining that the quenching rate at various positions of the 2219 aluminum alloy workpiece is not fast and uniform enough, the control system may perform a sixth operation to realize corresponding feedback control of the heating elements 9 of the hot stamping die and the upper die 8 of the hot stamping die, ensuring that the microstructure of the 2219 aluminum alloy workpiece does not precipitate a coarse precipitated phase, and the mechanical properties meet the corresponding requirements. The sixth operation may include optimizing the temperature and the clamping pressure of the hot stamping die until the quenching rate at various positions of the 2219 aluminum alloy workpiece is fast and uniform enough. More descriptions regarding determining whether the quenching rate at various positions of the 2219 aluminum alloy workpiece is fast and uniform enough may be found in the related description of FIG. 1. The quenching rate at various positions of the 2219 aluminum alloy workpiece being fast and uniform enough means that the quenching rate at various positions of the 2219 aluminum alloy workpiece may be essentially the same and fast enough. During the quenching process, the microstructure of the 2219 aluminum alloy may transform into a supersaturated solid solution state due to the temperature reduction.

5, a first process in-die aging treatment of the 2219 aluminum alloy workpiece may be continued on the hot stamping press. The plurality of third temperature sensors 4 and the plurality of fourth temperature sensors 6 on the hot stamping die may collect temperature information of the 2219 aluminum alloy workpiece and the hot stamping die in real time. The first pressure sensor 5 on the hot stamping press may collect clamping pressure information of the hot stamping die in real time. The temperature information and the clamping pressure information may be input into the control system. The control system may determine whether the temperature at various positions of the 2219 aluminum alloy workpiece uniformly reaches and maintains within a range of 220° C.-240° C., and whether aging time reaches 5 min. In response to determining that that the temperature at various positions of the 2219 aluminum alloy workpiece does not uniformly reach and maintain within the range of 220° C. and 240° C., and/or the aging time does not reach 5 min, the control system may optimize the temperature and the clamping pressure of the hot stamping die, and maintenance time until the temperature at various positions of the 2219 aluminum alloy workpiece uniformly reaches and maintains within the range of 220° C. and 240° C., and the aging time reaches 5 min, thereby realizing corresponding feedback control of the heating elements 9 of the hot stamping die and the upper die 8 of the hot stamping die, and ensuring that the microstructure and the mechanical properties of the 2219 aluminum alloy workpiece meet the corresponding requirements. The temperature at various positions of the 2219 aluminum alloy workpiece being uniform means that the temperature at various positions of the 2219 aluminum alloy workpiece may be essentially the same. During the first process in-die aging treatment, a relatively large rod-shaped θ' phase may gradually precipitate out of the matrix. At the end of the first process in-die aging treatment, the control system may perform preliminary feedback control of the automated transfer and positioning device based on the temperature information received from the plurality of third temperature sensors 4 on the hot stamping die.

6, the 2219 aluminum alloy workpiece completing the first process in-die aging treatment may be rapidly transferred from the hot stamping press to an aging press using the automated transfer and positioning device and positioned. At the beginning of the transfer and the positioning, the control system may perform preliminary feedback control of the automated transfer and positioning device based on the temperature information received from the plurality of third temperature sensors 4 on the hot stamping die. The plurality of fifth temperature sensors 10 or the plurality of second temperature sensors 2 on the automated transfer and positioning device may collect the temperature information of the 2219 aluminum alloy workpiece in real time and input the temperature information into the control system. The control system may determine whether the transfer and the positioning speed is fast enough based on the collected temperature information. In response to determining that the transfer and the positioning speed is not fast enough, the control system may perform a fourth operation to realize corresponding feedback control of the automated transfer and positioning device, ensuring that the 2219 aluminum alloy workpiece may be transferred and positioned from the hot stamping press to the aging press. More descriptions regarding the fourth operation and determining whether the transfer and the positioning speed is fast enough may be found in the related descriptions of FIG. 1. During the process of transfer and the positioning, the temperature drop of the 2219 aluminum alloy workpiece may be small due to the short time period, and the microstructure of the aluminum alloy workpiece may not have a significant change. At the end of the positioning of the 2219 aluminum alloy workpiece, the control system may perform, based on the temperature information collected from the plurality of second temperature sensors 2 or the plurality of fifth temperature sensors 10 on the automated transfer and positioning device, preliminary feedback control of the aging press and the die.

7, a second process in-die aging treatment may be performed on the 2219 aluminum alloy workpiece on the aging press. At the beginning of the second process in-die aging treatment, the control system may perform preliminary feedback control of the aging press and the aging die based on the temperature information collected from the plurality of second temperature sensors 2 or the plurality of fifth temperature sensors 10 on the automated transfer and positioning device. Specifically, the plurality of sixth temperature sensors 12 and the seventh temperature sensor plurality of 14 on the aging die may collect temperature information of the 2219 aluminum alloy workpiece and the aging die in real time, and the second pressure sensor 13 on the aging press may collect clamping pressure information of the aging die in real time. The temperature information and the clamping pressure information may be input into the control system. The control system may determine whether the temperature at various positions of the 2219 aluminum alloy workpiece uniformly reaches and maintains at 175° C., and whether the aging time reaches 4 h. In response to determining that the temperature at various positions of the 2219 aluminum alloy workpiece does not uniformly reach and maintain at 175° C., and/or the aging time does not reach 4 h, the control system may perform a seventh operation to realize corresponding feedback control of the heating elements 15 of the aging die and the upper die 11 of the aging die or to terminate the second process in-die aging treatment, ensuring that the microstructure and the mechanical properties of the 2219 aluminum alloy workpiece meet the corresponding requirements. The seventh operation may include optimizing the temperature and the clamping pressure of the aging die, and the maintenance time until the temperature at various positions of the 2219 aluminum alloy workpiece uniformly reaches and maintains at 175° C., and the aging time reaches 4 h. During the second process in-die aging treatment, a relatively small acicular $\theta''$ phase may gradually precipitate out of the matrix, leading to the microstructure in which the rod-shaped $\theta'$ phase and the acicular $\theta''$ coexist.

Figure 5:
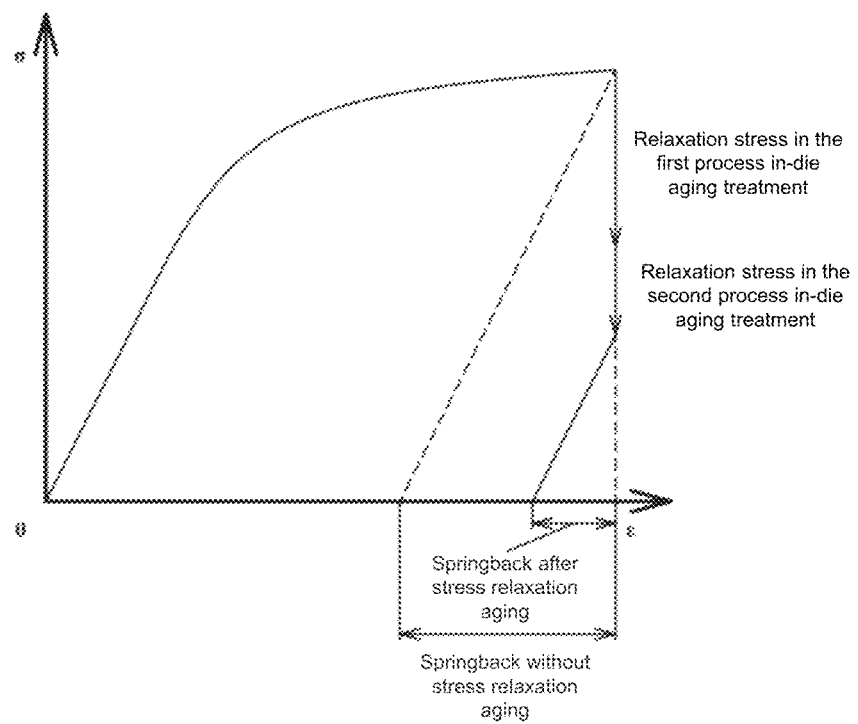
FIG. 5 is a schematic diagram illustrating a stress relaxation process of an in-die two-stage aging process of a 2219 aluminum alloy according to some embodiments of the present disclosure.

FIG. 5 is a schematic diagram illustrating a stress relaxation process of an in-die two-stage aging process of a 2219 aluminum alloy according to some embodiments of the present disclosure.

In the process of in-die two-stage aging, the 2219 aluminum alloy workpiece may be subjected to clamping pressure exerted by an aging die, and the elastic deformation of the 2219 aluminum alloy workpiece may be transformed into permanent creep deformation, which makes the stress required to maintain the deformation decrease, i.e., the stress relaxation occurs. During the first process in-die aging treatment, more elastic deformation of the workpiece may be transformed into the permanent creep deformation due to a relatively high aging temperature. In the second process in-die aging treatment, the aging temperature may be relatively low, but there is still a small portion of the elastic deformation of the workpiece that is transformed into the permanent creep deformation. After unloading, only a portion of the elastic deformation may disappear, the springback of the workpiece may decrease, and the forming precision may be improved. If the in-die two-stage aging is not performed, the hot stamping die may be unloaded immediately after the billet is hot stamped into a die cavity to form the workpiece; or the hot stamping die may maintain the pressure, but the temperature is relatively low, and the workpiece does not undergo stress relaxation, and all elastic deformation of the workpiece may disappear when the workpiece is taken out of the hot stamping die, resulting in serious springback and reduction in the forming precision.

In conclusion, the present disclosure provides the multi-sensor-based hot forming production system for the aluminum alloy sheet metal part and the control method of. The method may include controlling the hot forming production system to operate based on the temperature and the stamping speed of the constitutive model of the alloy and the forming limit model of the alloy; controlling the hot forming production system to operate based on the quenching rate of the TTT model and the TTP model of the alloy; and controlling the hot forming production system to operate based on the aging temperature and the aging time of the TTT model, the TTP model, and the yield strength model of the alloy. During the entire production process performed by the hot forming production system, the plurality of sensors may collect the corresponding sensing information in real time and input the sensing information into the control system based on the multi-physical quantity model. The control system may make the corresponding determination based on the built-in alloy material model, optimize the relevant process parameters, and carry out feedback control of the corresponding functional devices. In addition, the control system may take the condition at the end of each process step as the preliminary condition for the next process step to carry out preliminary feedback control of the functional devices for the next process step. By using the hot forming production system and the control method thereof, the product quality of the aluminum alloy sheet metal part and the stability of the forming process can be effectively improved, and the adaptability of the process to form different types of alloys can be improved. The alloy material model may include the constitutive model, the forming limit model, the TTT model, the TTP model, and the yield strength model of the alloy. More descriptions regarding optimizing the relevant process parameters by making the corresponding determination based on the constitutive model, the forming limit model, the TTT model, the TTP model, and the yield strength model of the alloy may be found in the related descriptions of FIG. 1.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A multi-sensor-based hot forming production system for an aluminum alloy sheet metal part, wherein a plurality of sensors are disposed in the hot forming production system, and the hot forming production system comprises closed-loop control of a whole process and adaptive production of the aluminum alloy sheet metal part based on deformation properties, a microstructure evolution law, and a mechanical property change law of a formed aluminum alloy, wherein the hot forming production system comprises a plurality of functional devices, and the plurality of functional devices include a control system based on a multi-physical quantity model, an environmental heating furnace, an automated transfer and positioning device, a hot stamping and forming device, and an in-die aging device; wherein
the control system is configured to control all the functional devices of the hot forming production system, each of the functional devices is capable of interacting with the control system, at the end of each process step, the control system performs preliminary feedback control of the functional devices for a next process step based on received parameters of a billet or a workpiece, the control system is provided with a constitutive model, a forming limit model, a model established basing on a Time-Temperature-Transformation Diagram (TTT model), a model established basing on a Time-Temperature-Properties Diagram (TTP model), and a yield strength model of an alloy, and the control system is capable of adjusting relevant parameters of the functional devices based on the constitutive model, the forming limit model, the TTT model, the TTP model, and the yield strength model to ensure a forming quality and mechanical properties of the workpiece, wherein the relevant parameters of the functional devices include heating temperature and duration of the environmental henting furnace, a transfer and positioning speed of the automated transfer and positioning device, a die temperature, a die displacement, a stamping speed, a clamping pressure, and a maintenance time of the hot stamping and forming device, and a die temperature, a clamping pressure, and a maintenance time of the in-die aging device;

a plurality of first temperature sensors are provided in the environmental heating furnace, the plurality of first temperature sensors being configured to collect temperature information at different positions of the billet during a solution treatment process, the control system is further configured to determine whether temperatures at the different positions of the billet evenly attain and maintain a solution treatment temperature, and whether a solution heat treatment time meets corresponding requirements based on the temperature information received from the plurality of first temperature sensors, in response to determining that the temperatures at the different positions of the billet do not evenly attain and maintain the solution treatment temperature and the solution heat treatment time does not meet the corresponding requirements, the control system is further configured to optimize the heating temperature and duration of the environmental henting furnace and carry out a corresponding feedback control of the environmental heating furnace;

one or two automated transfer and positioning devices are provided in the hot forming production system, each of the one or two automated transfer and positioning devices being configured simultaneously or separately to transfer the billet after the solution treatment and the workpiece after a first process in-die aging treatment;

in response to determining that one automated transfer and positioning device is provided in the hot forming production system, the automated transfer and positioning device is provided with a plurality of second temperature sensors, the plurality of second temperature sensors being configured to collect temperature information at different positions of the billet after the solution treatment, or to collect temperature information at different positions of the workpiece after the first process in-die aging treatment, the control system is further configured to determine whether the transfer and positioning speed is greater than a speed threshold based on the temperature information of the billet or the temperature information of workpiece received from the plurality of second temperature sensors, in response to determining that the transfer and positioning speed is greater than the speed threshold, the control system is further configured to optimize the transfer and positioning speed and carry out a corresponding feedback control on the transfer and positioning device;

in response to determining that two automated transfer and positioning devices are provided in the hot forming production system, the two automated transfer and positioning devices are provided with the plurality of second temperature sensors and a plurality of fifth temperature sensors, respectively, the plurality of second temperature sensors being configured to collect the temperature information at different positions of the billet after the solution treatment, and the plurality of fifth temperature sensors being configured to collect the temperature information at different positions of the workpiece after the first process in-die aging treatment, the control system is further configured to determine whether the transfer and positioning speed is greater than the speed threshold based on the temperature information of the billet or the temperature information of the workpiece received from the plurality of the second or the fifth temperature sensors, in response to determining that the transfer and positioning speed is not greater than the speed threshold, the control system is further configured to optimize the transfer and positioning speed and carry out the corresponding feedback control on the transfer and positioning device;

the hot stamping and forming device includes a hot stamping press, a temperature controllable hot stamping die, a plurality of third temperature sensors, a plurality of fourth temperature sensors, a displacement sensor, a speed sensor, and a first pressure sensor, wherein the plurality of third temperature sensors and the plurality of fourth temperature sensors are configured to collect the temperature information at different positions of the billet or on the workpiece, and the hot stamping die during hot stamping and forming, in-die quenching, and the first process in-die aging treatment, the displacement sensor is configured to collect displacement information of an upper die of the hot stamping die, the speed sensor is configured to collect stamping speed information of the upper die of the hot stamping die, and the first pressure sensor is configured to collect clamping pressure information of the hot stamping die during in-die quenching and the first process in-die aging treatment, the control system is further configured to determine whether an elongation of the alloy is lower than deformation degree of the billet and whether a planar principal strain state is within a safety zone based on the received temperature information of the billet, the die temperature, the die displacement information, the stamping speed information, the constitutive model, and the forming limit model, in response to determining that the elongation of the alloy is lower than the deformation degree of the billet and/or the planar principal strain state is not within the safety zone, the control system is further configured to optimize the die temperature, the die displacement, and the stamping speed and carry out a corresponding feedback control on the hot stamping device during the hot stamping process; and determine whether a quenching rate at various positions of the workpiece is fast enough and uniform and whether temperatures at the various positions of the workpiece are uniformly attained and maintained the first process aging temperature based on the received temperature information of the workpiece, the clamping pressure information, the TTT model, the TTP model, and the yield strength model, in response to determining that the quenching rate at various positions of the workpiece is not fast enough and uniform and the temperatures at the various positions of the workpiece are not uniformly attained and maintained the first process aging temperature, the control system is further configured to optimize the die temperature and the clamping pressure, and carry out the corresponding feedback control on the hot stamping device during the in-die quenching process and the first process aging; and the in-die aging device includes an aging press, a temperature controllable aging die, a plurality of sixth temperature sensors, a plurality of seventh temperature sensors, and a second pressure sensor, wherein the plurality of sixth temperature sensors and the plurality of seventh temperature sensors are configured to collect the temperature information at different positions of the workpiece and the aging die during a second process in-die aging treatment, and the second pressure sensor is configured to collect clamping pressure information of the aging die during the second process in-die aging treatment, the control system is further configured to determine whether the temperatures at the various positions of the workpiece uniformly attain and maintain a second aging temperature, and whether the aging time meets corresponding requirements based on the received temperature information of the workpiece, the clamping information, the TTT model, the TTP model, and the yield strength model, in response to determining that the temperatures at the various positions of the workpiece do not uniformly attain and maintain the second aging temperature, and the aging time does not meet the corresponding requirements, the control system is further configured to optimize the die temperature and the clamping pressure and carry out a corresponding feedback control on the in-die aging device accordingly during a second process aging.

2. The hot forming production system of claim 1, wherein a range of each of the plurality of first temperature sensors includes a solution treatment temperature of the aluminum alloy, each of the plurality of first temperature sensors is a contact temperature sensor or a non-contact sensor, and a spacing between two adjacent first temperature sensors of the plurality of first temperature sensors in the environmental heating furnace is within a range of 50 mm-150 mm.

3. The hot forming production system of claim 1, wherein in response to determining that one automated transfer and positioning device is provided in the hot forming production system, a range of each of the plurality of second temperature sensors includes a solution treatment temperature and the first process aging temperature of the aluminum alloy; and in response to determining that two automated transfer and positioning devices are provided in the hot forming production system, the range of each of the plurality of second temperature sensors includes the solution treatment temperature of the aluminum alloy, and a range of each of the plurality of fifth temperature sensors includes the first process aging temperature of the aluminum alloy; wherein
the plurality of second temperature sensors and the plurality of fifth temperature sensors are contact temperature sensors or non-contact sensors, a spacing between two adjacent second temperature sensors of the plurality of second temperature sensors on the automated transfer and positioning device is within a range of 100 mm-150 mm, and a spacing between two adjacent fifth temperature sensors of the plurality of fifth temperature sensors on the automated transfer and positioning device is within a range of 100 mm-150 mm.

4. The hot forming production system of claim 1, wherein a range of each the plurality of third temperature sensors and each of the plurality of fourth temperature sensors includes a solution treatment temperature and a first process aging temperature of the aluminum alloy, the plurality of third temperature sensors and the plurality of fourth temperature sensors are both contact temperature sensors, a spacing between two adjacent third temperature sensors of the plurality of third temperature sensors on an operation surface of the hot stamping die is within a range of 50 mm-150 mm, and a spacing between two adjacent fourth temperature sensors of the plurality of fourth temperature sensors on the operation surface of the hot stamping die is within a range of 50 mm-150 mm.

5. The hot forming production system of claim 1, wherein the displacement sensor is a linear displacement sensor, a range of the displacement sensor including a travel range of the upper die of the hot stamping die, and the displacement sensor being a magnetic sensor or an optical sensor;
the speed sensor is a linear speed sensor, a range of the speed sensor including a stamping speed range of the upper die of the hot stamping die, and the speed sensor being the magnetic sensor or a photoelectric sensor; and
a range of the first pressure sensor includes a clamping pressure range of the hot stamping die, the first pressure sensor being a piezoelectric sensor.

6. The hot forming production system of claim 1, wherein a travel range of the upper die of the hot stamping die is within a range of 1000 mm-1500 mm, a stamping speed range of the upper die of the hot stamping die is within a range of 100 mm/s-1000 mm/s, and a clamping pressure range of the hot stamping press is within a range of 1000 KN-50000 kN.

7. The hot forming production system of claim 1, wherein a range of each of the plurality of sixth temperature sensors and each of the plurality of seventh temperature sensors includes the second aging temperature of the aluminum alloy, the plurality of sixth temperature sensors and the plurality of seventh temperature sensors are contact temperature sensors, a spacing between two adjacent sixth temperature sensors of the plurality of sixth temperature sensors on an operation surface of the aging die is within a range of 50 mm-150 mm, and a spacing between two adjacent seventh temperature sensors of the plurality of seventh temperature sensors on the operation surface of the aging die is within a range of 50 mm-150 mm.

8. The hot forming production system of claim 1, wherein a range of the second pressure sensor includes a clamping pressure range of the aging die, and the second pressure sensor is a piezoelectric sensor.

9. The hot forming production system of claim 1, wherein a clamping pressure range of the aging press is within a range of 1000 KN-50000 kN.

10. The hot forming production system of claim 1, wherein the control system is further configured to:
determine, based on the received temperature information and solution heat treatment time, whether the temperatures at the different positions of the billet evenly attains and maintain the solution treatment temperature, and whether the solution heat treatment time meets the corresponding requirements; and
in response to determining that a temperature at each part of the billet does not evenly attain and maintain the solution treatment temperature, and the solution treatment duration does not meet the corresponding requirements, optimize the heating temperature and maintenance duration time of the environmental heating furnace until the temperature at each part of the billet evenly attains and maintains the solution treatment temperature, and the solution treatment time meets the corresponding requirements.

11. The hot forming production system of claim 10, wherein the control system is further configured to:
in response to determining that the temperatures at the different positions of the billet do not evenly attain and maintain the solution treatment temperature, and the solution heat treatment time does not meet the corresponding requirements, adjust heating elements at different positions of the environmental heating furnace to different powers according to various temperatures at the different positions of the billet.

12. The hot forming production system of claim 1, wherein the control system is further configured to:
- calculate the deformation temperature and the strain rate according to the received temperature information of the billet, the die displacement information, and the stamping speed information;
- determine, based on the constitutive model, the forming limit model, the calculated deformation temperature, and the calculated strain rate, whether the elongation of the alloy is lower than the deformation degree of the billet and whether the planar principal strain state of the alloy is in the safety zone; and
- in response to determining that the elongation of the alloy is lower than the deformation degree of the billet, and/or that the planar principal strain state of the alloy is not within the safety zone under the current condition, optimize temperature of the hot stamping die and displacement and stamping speed of the upper hot stamping die until the elongation of the alloy is higher than the deformation degree of the billet and the planar principal strain state of the alloy is within the safety zone under the current condition.

13. The hot forming production system of claim 1, wherein the control system is further configured to:
- calculate the workpiece temperature, the variation rate of the workpiece temperature and the duration of the in-die quenching process and the first process aging according to the received temperature information, the clamping pressure information and the holding time information;
- determine, based on the TTT model, the TTP model, and the calculated workpiece temperature, the variation rate of the workpiece temperature and the duration of the in-die quenching process, whether the quenching rate is fast enough and uniform everywhere in the workpiece during the in-die quenching process;
- in response to determining that the quenching rate is not fast enough and/or uniform everywhere in the workpiece, optimize the temperature and the clamping pressure of the hot stamping dies until the quenching rate is fast enough and uniform everywhere in the workpiece;
- determine, based on the TTT model, the TTP model, the yield strength model, and the calculated workpiece temperature and the duration of the first process aging, whether the temperature of the workpiece at each part uniformly attains and maintains the first process aging temperature, and whether the first step aging time meets the corresponding requirements; and
- in response to determining that the temperature of the workpiece at each part does not uniformly attain and maintain the first process aging temperature, and/or the aging time does not meet the corresponding requirements, optimize the temperature, the clamping pressure and maintenance time of the hot stamping dies until the temperature of the workpiece at each part uniformly attains and maintains the first process aging temperature, and the aging time meets the corresponding requirements.

14. The hot forming production system of claim 1, wherein the control system is further configured to:
- determine, based on the received temperature information, the pressure information, time information, the TTT model, the TTP model, and the yield strength model, whether the temperatures at different positions on the workpiece uniformly attain and maintain the second aging temperature, and whether the second process aging time meets the corresponding requirements; and
- in response to determining that the temperatures at different positions on the workpiece do not uniformly attain and maintain the second aging temperature and the aging time does not meet the corresponding requirements, optimize the temperature, the clamping pressure and maintenance time of the aging dies.

15. A control method of the multi-sensor-based hot forming production system for the aluminum alloy sheet metal part of claim 1, comprising controlling of the temperature and the stamping speed based on the constitutive model of the alloy and the forming limit model of the alloy; controlling of the quenching rate based on the TTT model and the TTP model of the alloy; and controlling of an aging temperature and the aging time based on the TTT model, the TTP model, and the yield strength model of the alloy, wherein during an entire production process, which includes a solution heat treatment, transferring and positioning, hot stamping, in-die quenching and the first process aging, second transferring and positioning, and the second process aging, performed by the hot forming production system, a plurality of sensors collect sensing information in real time and input the sensing information into a control system based on a multi-physical quantity model, the control system makes corresponding determination based on a built-in alloy material model, optimizes relevant process parameters and carries out feedback control of corresponding functional devices, and takes a condition at the end of each process step as a preliminary condition for the next step to carry out preliminary feedback control of the functional devices of the next step.

* * * * *